United States Patent [19]

Steuer et al.

[11] Patent Number: 4,721,013
[45] Date of Patent: Jan. 26, 1988

[54] MULTI-SPEED HUB FOR BICYCLES OR THE LIKE

[75] Inventors: Werner Steuer, Schweinfurt, Fed. Rep. of Germany; Eduard Bergles, Graz, Austria

[73] Assignee: Fichtel & Sachs AG, Fed. Rep. of Germany

[21] Appl. No.: 790,862

[22] Filed: Oct. 24, 1985

[30] Foreign Application Priority Data

Nov. 2, 1984 [DE] Fed. Rep. of Germany ....... 3440067

[51] Int. Cl.⁴ ............................................. F16H 3/44
[52] U.S. Cl. ................................. 74/750 B; 74/781 B; 192/6 A
[58] Field of Search .................... 74/750 B, 781 B; 192/6 A

[56] References Cited

U.S. PATENT DOCUMENTS

| | | | |
|---|---|---|---|
| 1,490,644 | 4/1924 | Sturmey-Peart | 74/758 |
| 3,166,171 | 1/1965 | Schwerdhofer et al. | 74/750 B X |
| 3,257,868 | 6/1966 | Preece | 74/750 B |
| 3,809,195 | 5/1974 | Schulz et al. | 192/6 A |
| 3,828,627 | 8/1974 | Schwerdhofer | 74/750 B |
| 3,973,451 | 8/1976 | Kine | 74/750 B |
| 4,059,028 | 11/1977 | Schulz et al. | 74/781 B |
| 4,065,984 | 1/1978 | Nakajima | 74/750 B |
| 4,147,244 | 4/1979 | Segawa et al. | 192/6 A |

FOREIGN PATENT DOCUMENTS

| | | | |
|---|---|---|---|
| 136676 | 3/1950 | Australia | 74/781 B |
| 511864 | 6/1952 | Belgium | 74/781 B |
| 2337725 | 2/1975 | Fed. Rep. of Germany . | |
| 2458871 | 6/1975 | Fed. Rep. of Germany . | |
| 2514418 | 10/1976 | Fed. Rep. of Germany . | |
| 24771 | 12/1950 | Finland | 74/781 B |
| 439639 | 6/1912 | France . | |
| 914176 | 10/1946 | France . | |
| 473205 | 10/1937 | United Kingdom . | |
| 519945 | 4/1940 | United Kingdom | 74/781 B |
| 541332 | 11/1941 | United Kingdom . | |

OTHER PUBLICATIONS

Planetengetriebe, Schaltsysteme und Freilaufe in Fahrrad-und Motorradnaben, pp. 374–382, 4/1965.

Primary Examiner—Leslie Braun
Assistant Examiner—Dwight G. Diehl
Attorney, Agent, or Firm—Loren, McGeady & Associates

[57] ABSTRACT

The invention relates to a multi-speed hub for bicycles or the like having a gear shift system for more than three gears, wherein the hub transmission comprises a single planetary transmission with axially fixed planet carriers with stepped planet gears and with two different sun wheels, control of the hub transmission taking place coaxially through the hub shaft, there being for the gear shift elements in the hub a single control system which has to be operated from only one side of the hub shaft, the hub further comprising an arrangement of concentric separate sleeve-like components which are in functional sequence subject to the action of a shift head guided in the hub shaft and subject to spring tension. Such a construction provides a multi-speed hub which has an unusually large number of selectable gear stages, all of which can be operated from one axial side of the hub and by a single shift device and in functional sequence, actuation of this multi-speed hub being simple and functionally reliable. Furthermore, such a multi-speed hub with more than three gear stages also comprises a back-pedalling brake device.

66 Claims, 41 Drawing Figures

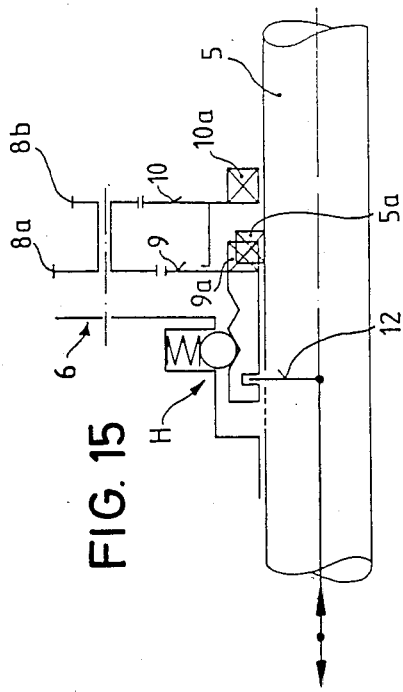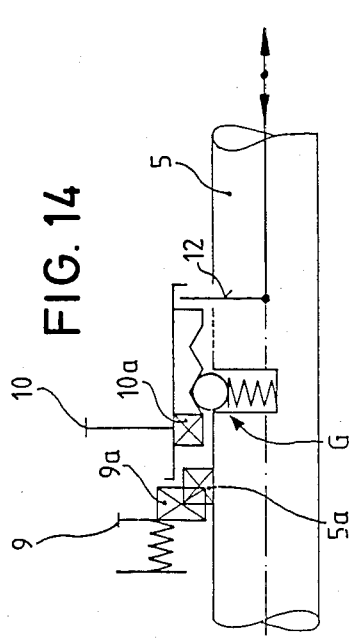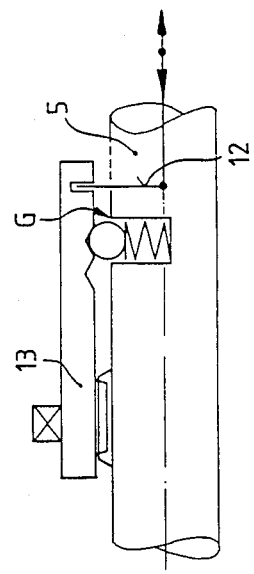

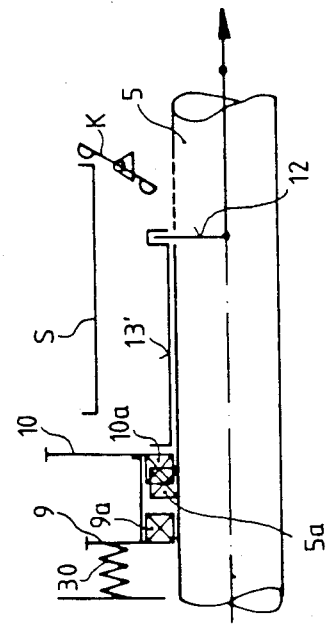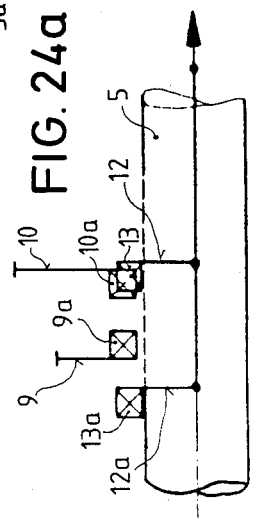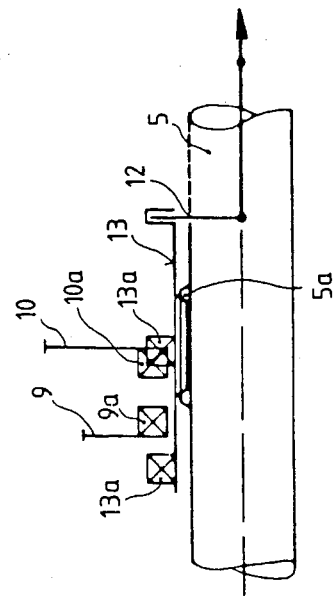

MULTI-SPEED HUB FOR BICYCLES OR THE LIKE

The invention relates to a multi-speed hub for bicycles or the like, with a gear shift system for more than three gears where the hub transmission system includes a single planetary system with stepped planet gears on an axially fixed planet carrier and with two different sun wheels wherein control of the hub transmission takes place coaxially through the hub shaft.

Already known is a 5-speed bicycle hub in which the planetary transmission comprises a system of stepped plant wheels and two sun wheels which can be locked alternately on the hub shaft. For controlling this hub transmission, shift means are provided on each side of the hollow-bored hub shaft. This arrangement is expensive and requires two separate shift means for actuation by the bicycle user. Such a mode of operation for a bicycle multi-speed gear change system is cumbersome and requires quite a lot of skill on the part of the bicycle user in order quickly and correctly to adjust the gear stage necessary at the time in order to be able to ride within a certain range of road speeds. In the last analysis, the unfavourable operation makes such a hub gear shift system with two shift members undesirable.

Another factor which makes such a multi-speed hub intolerable is its technical nature, namely the fact that between the individual gear shift stages, shift positions are possible in which the propulsion means or driver is capable of being turned ineffectually, i.e. the pedals can be turned in the drive direction without effect.

Such an operating condition can be extremely disturbing for the user of the bicycle and cannot be tolerated in terms of operational reliability of the bicycle.

The object of the present invention is, inter alia, and while avoiding the aforedescribed unacceptable factors, to provide a hub which has more than three speeds and which is intended for bicycles or the like. The aim which it is intended to achieve is not only to provide a maximum of operating safety and facility but also to provide a back-pedalling brake device accommodated within the hub and constantly ready to brake the machine.

A particularly advantageous solution to this problem is the use of a single control system for the gear shift elements in the hubs. The control system is actuated from only one side of the hub shaft, and includes an arrangement of concentric separate sleeve-like component elements on which in functioning sequence a gear shift head guided in the hub shift and subject to spring tension can act. With such an embodiment, a bicycle hub having more than three gears is provided and all can be selected by a single shift means and from one axial side of the hub, actuation of this multi-speed hub according to the invention being simple and involving no particular complication. Furthermore, the embodiment according to the invention makes it possible to dispose in the hub sleeve not only a transmission for more than three gears but also a back-pedalling brake device offering braking capability at all times.

The invention will be explained in greater detail hereinafter with reference to an example of embodiment of a hub having more than three speeds and illustrated in FIG. 1 of the drawings, which shows a hub with five speeds and with an integrated back-pedalling braking device.

For further details of the invention, reference is made to the other drawings, which show in individual and diagrammatic form various solution possibilities in respect to individual details of design.

In detail, the drawings show in:

FIG. 1 a multi-speed hub which can be shifted from one side of the axle and provided with five speeds and a back-pedalling brake device, the drawing being shown in half-longitudinal section;

FIGS. 2a and 2a' or 2b and 2b' show arrangements wherein sun wheels are mounted for axial displacement on the hub shaft which is fitted with coupling teeth;

FIGS. 3, 3a and 4, 4a each show arrangements of axially displaceable sun wheels mounted on the hub shaft which has two sets of coupling teeth;

FIGS. 5, 5a and 6, 6a each show arrangements of axially fixed sun wheels on the hub shaft, a coupling element being axially displaceable in the hub shaft;

FIGS. 7, 7a and 8, 8a each show an arrangement of axially fixed sun wheels on the hub shaft, two displaceable coupling element being provided in the hub shaft;

FIGS. 9 and 9a show an arrangement of axially fixed sun wheels, a sliding sleeve being provided on the hub shaft and comprising coupling elements;

FIGS. 10 and 11 each show an arrangement of axially fixed sun wheels which can be alternately coupled by means of a sliding sleeve which is rotationally rigid on the hub shaft;

FIGS. 12 and 13 show examples of gear selection systems for the sun wheels where inoperative shift positions are avoided;

FIGS. 14 and 15 each show a way in which one of the sun wheels which is to be rotationally rigidly coupled to the hub shaft can be axially locked by ratchet means;

FIGS. 16, 17 and 18 show gear shift systems in which the sun wheels are in themselves axially fixed, each being capable of being axially locked by ratchet means via a sliding sleeve which is rotationally rigid with the hub shaft but which can be displaced axially for coupling the sun wheels;

Figure 1:
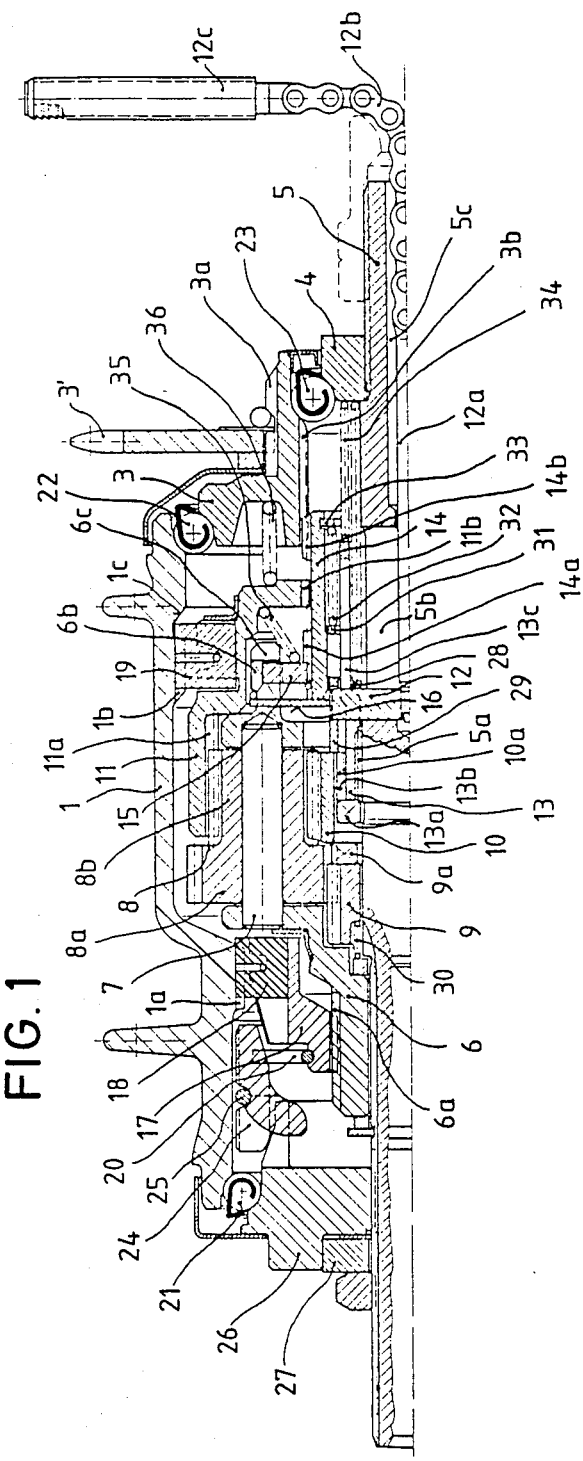
Figure 23:
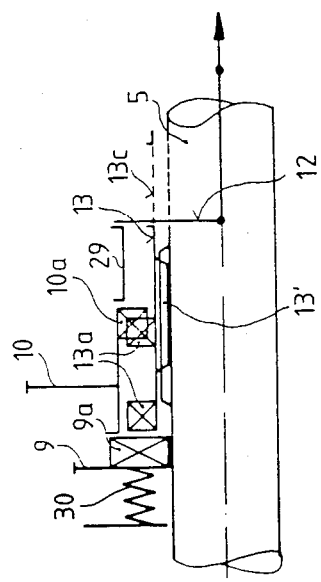
Figure 22:
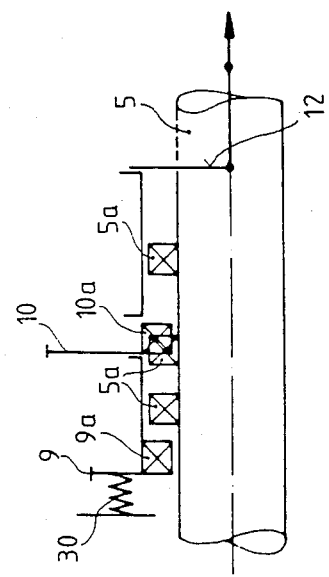
Figure 26:
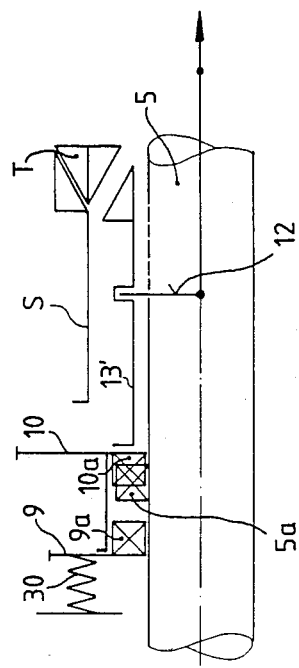
Figure 27:
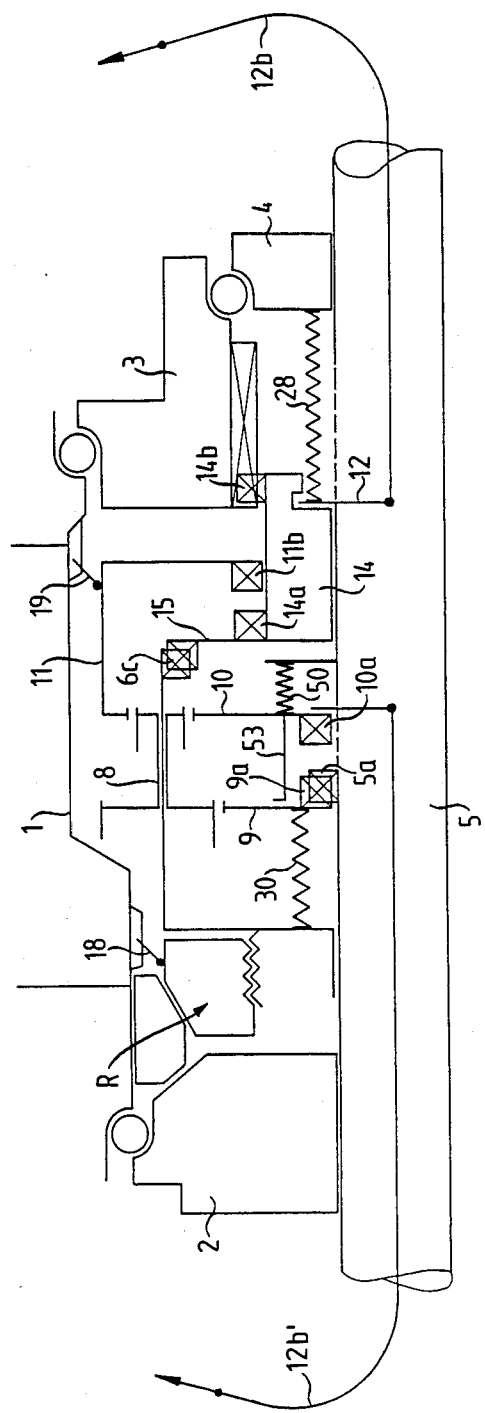
Figure 28:
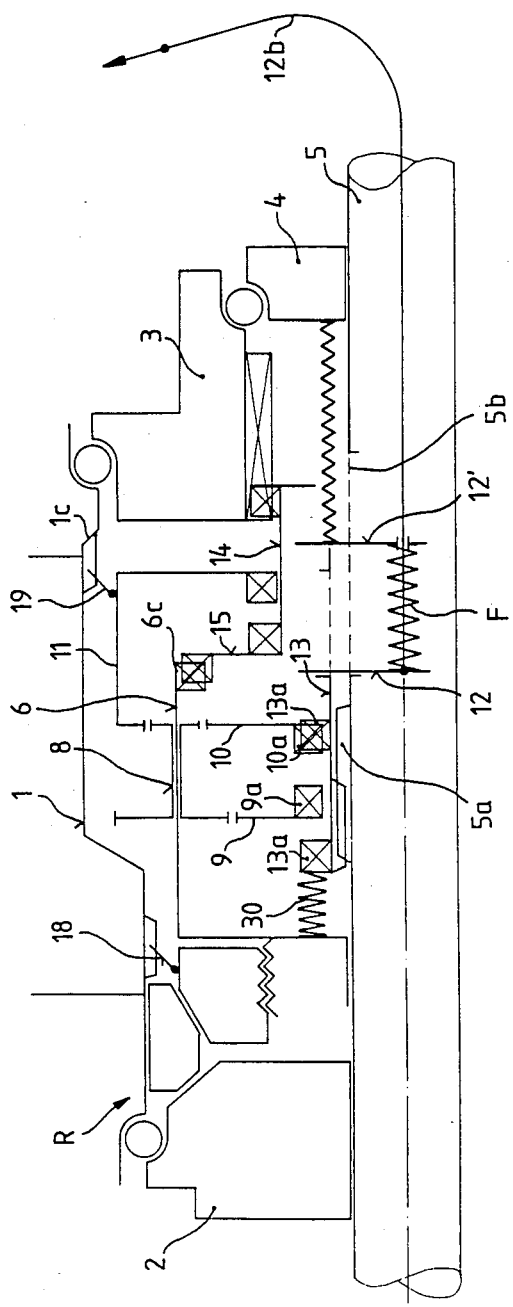
Figure 29:
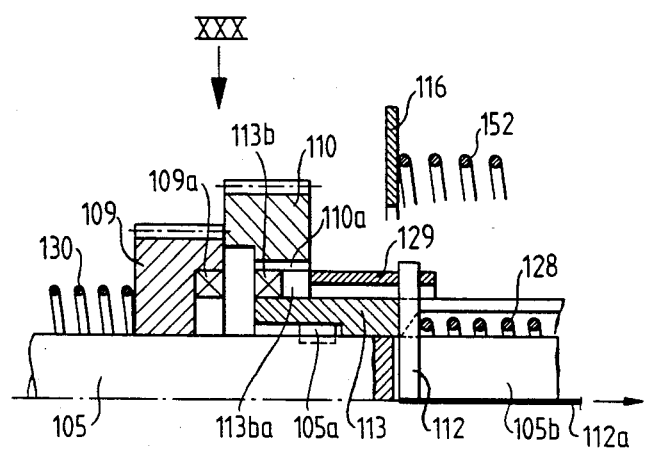
Figure 30:
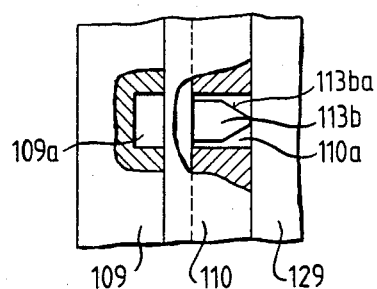

FIGS. 22 to 23 each show a gear shift system which, with axially displaceable sun wheels, needs to be shifted in only one direction;

FIG. 24 shows a construction for gear shift actuation in only one direction and with axially fixed sun wheels;

FIG. 24a shows an alternative to the construction in FIG. 24;

FIGS. 25 and 26 show a construction for a gear shift system for axially displaceable sun wheels, reversal of movement of a special control sleeve being achieved in a different way;

FIG. 27 shows an example of embodiment of a 5-speed hub with two gear shift actuating elements;

FIG. 28 shows an example of embodiment of a 5-speed hub with only one gear shift actuating element;

FIG. 29 shows a structural modification of FIG. 1 in a partial and diagrammatic view, and FIG. 30 shows a view of FIG. 29 in the direction of the arrow XXX in FIG. 29.

In the case of the multi-speed hub with more than three gears and a back-pedalling brake device as shown, for example, in FIG. 1, reference numeral 1 denotes the hub sleeve which is mounted for rotation on a lever cone 26 and a driver 3 through ball races 21 and 22. The driver 3 which carries in driver grooves 3a a chain sprocket 3' is in turn mounted via a ball race 23 to be rotatable on a fixed cone 4 which is bolted to the hub shaft 5.

A planet carrier 6 is mounted for rotation on the hub shaft 5 but is axially fixed, being located inside the hub sleeve 1. This planet carrier 6 has, mounted on arbors 7, planet wheels 8 which are constructed as stepped planet wheels 8a and 8b, which mesh both with a concentric internal gear 11 and also with sun wheels 9 and 10 disposed on the hub shaft 5.

The sun wheels 9, 10 can be controlled by means of a thrust block 12 which, against a tension of a thrust spring 28, slides in a slot 5b of the hub shaft 5, being actuated from the outside via a draw rod 12a through a chain 12b with a connector 12c. Constantly acting on the sun wheel 9 which is on the left-hand side axially is a coaxial thrust spring 30, the tension of which is transmitted to the sun wheel 10 by virtue of its being applied against the sun wheel 9. The means of actuating the draw rod 12a with chain 12b and connector 12c for controlling the thrust block 12 is not shown here. The sun wheels 9, 10 have different numbers of teeth and can be alternately and rotationally rigidly coupled, the sun wheel 9 being capable of being coupled through axial coupling dogs 9a by axial displacement, with corresponding dogs 13a on a sliding sleeve 13 which is itself disposed on the hub shaft 5 so as to be rotationally rigid by means of dogs 5a, while being at the same time axially displaceable. In the gear shift position of the multi-speed hub which is shown in FIG. 1, the sun wheel 10 which has the greater number of teeth is by means of coupling elements 10a rigidly engaged with the sliding sleeve 13 which coaxialy accommodates the sun wheel 10 but is itself axially displaceable. The sun wheel 10 meshes thereby with the stepped planet gear 8b which has a lesser number of teeth while the sun wheel 9 which is loosely rotatable on the hub shaft 5 meshes with the planet stepped wheel 8a which has the larger number of teeth. The thrust spring 30 acts axially from the left on both sun wheels 9 and 10.

As will be described hereinafter, a coupling bush 14 is mounted on the hub shaft 5 coaxially with the sliding sleeve 13 and is rotatable and axially displaceable against spring tension. On its outer periphery, the coupling bush 14 is provided with axially separate tooth systems 14a and 14b, the tooth system 14a which is on the left-hand side axially is additionally arranged for the rotationally rigid accommodation of a laterally disposed driving plate 15. The axially right-hand set of teeth 14b on the coupling bush 14 constantly engages the axially long interally cut teeth 3b on the driver 3.

By axial displacement of the coupling bush 14, it is possible to couple either the driver plate 15 with axial dogs 6b on the planet carrier 6 or to couple the externally cut teeth 14a with corresponding internally cut teeth 11b on the internal gear 11, in a manner which will be described in detail hereinafter. Axially to the left of the coupling bush 14 there is fixed on the dogs 6b of the planet carrier 6 a plate 16, the function of which will be mentioned later.

On the axially outermost left-hand shank part of the planet carrier 6 there is, axially displaceable on a positioning screwthread 6a, a brake cone 17 which is constructed at the same time as a carrier for a set of drive detents 18 which, subject to the tension of an annular spring, constantly engage an internal locking mechanism 1b in the hub sleeve 1, as shown for example in FIG. 1, or which can also be disengaged by means of a cone face 1c in the hub sleeve 1.

The aforementioned brake cone 17, subject to the action of a friction spring 20, is in a manner as yet to be described, moved axially leftwardly on the positioning screwthread of the planet carrier shank upon reverse rotation of the driver 3, so spreading apart a brake casing 24/25 which is for its part mounted in rotationally rigid fashion on a lever cone 2 provided with brake lever 27. The opening-out of the brake casing 24, 25 in the hub sleeve 1 causes the latter to be reliably braked.

As FIG. 1 clearly shows, the aforementioned thrust block 12 is subject to the tension of a coaxial thrust spring 28 which is biased on the fixed cone 4 on the hub shaft 5 and which can be displaced axially rightwardly by means of the draw rod 12a with the connected chain 12b and connector 12c in order to achieve other gear stages, as will be described hereinafter. The gear shift switch which is connected by a cable of the connector 12c is not shown in the drawings.

FIG. 1 shows the multi-speed hub which is illustrated by way of example in the gear shift position for 5th gear (high speed gear). The thrust block 12 biased by the spring 28 is in the axially left-hand position inside the hub shaft slot 5b. The sliding sleeve 13 is, under the action of a coaxial thrust spring 34, in the axially left-hand extreme position which is defined by the dogs 5a which serve for rotationally rigid mounting of the sliding sleeve 13. The sliding sleeve 13 is enclosed by an intermediate sleeve 29 which is penetrated without clearance by the thrust block 12, as FIG. 1 clearly shows. This intermediate sleeve 29 forms the axial abutment rightwards for the sun wheel 10 which is biased from the left by the sun wheel 9 which is subject to the action of the thrust spring 30. In the gear shift position shown in FIG. 1, the sun wheel 10 is rotationally rigidly connected by its radial coupling elements 10a to the sliding sleeve 13 through radially outwardly directed coupling elements 13b. And so the sun wheel 10 is directly rotationally rigid on the hub shaft 5, while the sun wheel 9 is free to rotate on the hub shaft 5 in this gear shift position because by virtue of the axially outermost location on the left-hand side, there is no coupling connection to the axial elements 9a of the sun wheel 9 with the corresponding coupling teeth 13a of the sliding sleeve 13.

As can be seen in FIG. 1, the coupling bush 14 has its teeth 14b engaged in the driver 3/3b, while the teeth 14a are operatively connected to the dogs 6b of the planet carrier 6 via the drive plate 13 which is rotationally rigid on it. The planet carrier 6 drives through its bearing arbors 7 the planet wheels 8, of which the stepped wheel 8b meshes with the sun wheel 10 which is rotationally rigid in the aforedescribed manner and also with the intrenal gear teeth 11a. The internal gear 11 is connected to the internal locking mechanism 1b in the hub sleeve 1 through the set of driving detents 19.

In the 5th gear illustrated, the torque flow is as follows:

Sprocket on driver 3 with internal teeth 3b—external teeth 14b on coupling sleeve 14 to the external teeth 14a with driver plate 15—dogs 6b on the planet carrier 6—planet carrier arbor 7 with planet gear 8—stepped wheel 8b rolling on the rotationally rigid sun wheel 10—internally cut teeth 11a in the internal gear 11—driving detents 19—internal locking mechanism 1b in the hub sleeve 1. The driving detents 18 on the brake cone 17 which rotates more slowly with the planet carrier 6 are overtaken by the internal locking mechanism 1a of the hub sleeve 1.

For the 4th gear shift position (next-to-high speed gear), the thrust block 12 is pulled axially rightwardly sufficiently that the sun wheel 10 which bears directly on the intermediate sleeve 29 is, under the influence of the sun wheel 9 which is subject to the action of the thrust spring 30, displaced axially rightwards until the coupling dogs 9a engage the dogs 13a of the sliding sleeve 13, while the coupling elements 10a of the sun wheel 10 are now disengaged from the sliding sleeve 13/13b. The other elements of the hub transmission remain in the location described with reference to the 5th gear position. In 4th gear, the torque flow is as follows:

Chain sprocket to driver 3 with internal teeth 3b—externally cut teeth 14b on the couping bush 14 to the left-hand externally cut tooth system 14a with driver plate 15—dogs 6b on the planet carrier 6—bearing journal 7 with planet wheels 8b/8a—stepped planet wheel 8a rolling on the sun wheel 9 and in the internal gear 11/11a—drive detents 19 on the internal gear 11—hub sleeve 1 with internal locking mechanism 1b.

To achieve the shift position relative to direct gear (3rd gear), the thrust block 12 is pulled further rightwards axially so that the coupling bush 14 can now, by virtue of the intermediate sleeve 29 bearing on the thrust spring 32 concentric in the coupling bush 14, be displaced axially rightwards against the force of the thrust spring 35 bearing on the driver plate 15, bringing about engagement of the exterally cut teeth 14a with the internally cut teeth 11b in the internal gear 11, while the previously operative driver plate 15 is disengaged. The previously rotationally rigidly coupled sun wheel 9 remains in its position, the sun wheel 10 continues to be rotatable on the sliding sleeve 13.

The torque flow is now as follows: chain sprocket on driver 3 with internally cut teeth 3b—externally cut teeth 14b of the coupling bush 14 with externally cut teeth 14a internal gear—interanlly cut teeth 11b—internal gear 11 with driving detents 19—internal locking mechanism 1b in the hub sleeve 1. The planet carrier itself is driven more slowly that the locking detents 18 on the brake cone 17 are overtaken by the hub sleeve 1.

To achieve the shift position for second gear (next-to-botom climbing gear), the gear shift arrangement causes the thrust block 12 to be pulled farther and axially rightwards so that via the coupling bush 14 the internal gear 11 is displaced sufficiently against the tension of the thrust spring 36 that the detents 19 on the internal gear are disengaged from the shift cone surface 1c of the hub sleeve 1.

The axial movement of the thrust block in relation to the sliding sleeve 13 is made possible by an axially long slot 13c. The sliding sleeve 13 has remained in the axial location shown in FIG. 1 while the rotationally rigid coupling of the sun wheel 9 to the sliding sleeve 13 mentioned in connection with the gear shift position for 4th gear is retained unaltered. Correspondingly, the sun wheel 10 is rotatable on the sliding sleeve 13.

In 2nd gear (next-to-bottom climbing gear), the torque flow is as follows: chain sprocket on drive 3 with internal locking mechanism 3b—*externally cut teeth 14b* of the coupling bush with externally cut teeth 14a—internally cut teeth 11b in the projection of the internal gear 11—internally cut teeth 11a in the internal gear—stepped planet gear 8b—stepped gear 8a rolling on the sun wheel 9—bearing journal 7 of the axially fixed planet gear carrier—planet carrier 6 with brake cone 17 on the coarse screwthread 6a—ratchet detent set 18—internal locking mechanism 1a of the hub sleeve 1.

In order to achieve the gear shift position for 1st gear (bottom climbing gear), the actuation of the gear shift causes the thrust block 12 to be pulled still farther rightwards in an axial direction, the sliding sleeve 13, due to the thrust block abutting the end of the longitudinal slot 13c, is itself displaced axially rightwards against the thrust spring 34 so that also the spring 32 is compressed. In consequence, the coupling connection between the sun wheel 9 and the sliding sleeve 13 which previously existed is nullified because the sun wheel 9 can no longer follow the displacement movement of the sliding sleeve 13 but by virtue of the adjacent sun wheel 10 bearing on an intermediate plate 16, becomes axially fixed. This intermediate plate 16 is mounted on the dogs 6b of the axially fixed planet carrier 6. The axially farther rightwardly displaced sliding sleeve 13 now forms with its coupling dogs 13b a rotationally rigid coupling with the sun wheel 10 which bears axially rightwardly on the intermediate plate 16. The sliding sleeve 13 itself is, in this position, too, held rotationally rigidly on the hub shaft 5 by the shaft dogs 5a.

In the gear shift position for 1st gear, the torque flow is as follows: chain sprocket on driver 3 with inernally cut teeth 3b—externally cut teeth 14b of the coupling bush 14 with externally cut teeth 14a—interally cut teeth 11b in the projection on the internal gear—interally cut teeth 11a of the internal gear 11—stepped planet gear 8b meshing on sun wheel 10—planet gear bearing journal 7 in planet carrier 6—brake cone 17 on positioning screwthread projection 6a—ratchet detent set 18 engaging internal locking mechanism 1a on the hub sleeve 1.

As emerges clearly from the foregoing description, the embodiment of multi-speed hub according to the invention and having more than three speeds comprises in particular an arrangement of concentric sleeve elements by the relative displacement of which in respect of one another, the gears are shifted against spring tension. They are on the one hand the radially outer coupling bush 14 and on the other the sleeve arrangement includes the intermediate sleeve 29 displaceable on the sliding sleeve 13 and which, controlled directly by the thurst block 12, can axially control the sun wheels 9 and 10 and finally the radially inner sliding sleeve 13 itself which is displaceable directly on the hub shaft 5 and, corresponding to the axial location, is constructed to be alternately rotationally rigidly coupled to the sun wheel 9 or sun wheel 10. In order to achieve a constant readiness for coupling, either on the sliding sleeve 13 or also on one of the sun wheels 9, 10, preferably on the small sun wheel 9, there is a system of sloping deflector faces. The concentric thrust springs 28 and 34 provided with the sleeve arrangement can expediently be spaced apart by means of appropriate end caps with an axial length corresponding to parts.

The foregoing description of an example of embodiment of a multi-speed hub with more than three gears clearly shows that only a single planetary transmission with stepped planet gears on an axially fixed planet carrier is used; it has an axially displaceable internal gear and sun wheels with differing numbers of teeth which can be coupled alternately and in a rotationally rigid manner is used.

Control of the previously-described 5-speed gear shift stages takes place solely from one side of the hub shaft by means of one single shift element, of which only the thrust block 12 on the draw rod 12a with draw chain 12b is shown.

The previously described hub having more than three gears has not only the extremely simple and reliable control from only one side of the hub but also the advantage that a back-pedalling brake device can be accommodated in the hub. This back-pedalling brake device, for example, in the case of a braking operation when the bicycle is travelling at the last-mentioned 1st gear velocities, operates as follows:

When the driver 3 is rotated in reverse, this rotary movement is passed via the torque path of 1st gear. The rearwardly rotating planet carrier 6, by means of its adjusting screwthread 6a, displaces the brake cone 17 which is held secure agsint co-rotation by the friction spring 20 in an axially leftward direction, so that the brake shell 24 which is rotationally rigid on the lever cone 26 is opened out inside the hub sleeve 1 in the direction required to produce braking. The drive detents 18 remain inoperative while the system is turning in reverse.

By reason of the axial dogs 6b on the planet carrier 6 and having corresponding oblique faces, co-operation with the driver plate 15 on the coupling bush 14 and the internal gear 11 with the projecting part means that not only a constant drive readiness but also a constant brake readiness is available. This constant readiness for coupling within the hub transmission system is also contributed to by the aforementioned sloping faces either on the sliding sleeve 13 or on one of the sun wheels 9, 10.

When the gears are in the positions relative to 2nd and 3rd gears (next-to-bottom climbing gear and direct gear), braking takes place in each case at the lower transmission ratio provided for by the torque flow through the sun wheel 9.

In the shift position for 4th and 5th gears respectively, the hub transmission is by-passed when the brakes are applied. In both these positions—as described—the coupling bush 14 is conencted through the driver plate 15 directly to the planet carrier 6. This torque path is retained when the driver 3 is turned in reverse so that with no interposed transmission stages the brake cone 17 is displaced by the rearwards-rotating planet carrier 6, resulting in an opening-out of the brake casing 24, 25 so that in known manner, braking is applied to the hub sleeve 1. The ratchet detents 19 on the internal gear 11, operative when the bicycle is being driven in 4th and 5th gears, do not participate.

The individual components which can be used for a gear shift hub for more than three speeds, and which, as has been previously described, can be controlled from one side of the hub shaft by means of a single element, will be described particularly hereinafter with reference to the diagrammatic drawings in FIGS. 2 to 28.

It is the object of the hereinafter described elements of a multi-speed hub to provide a hub comprising a back-pedalling brake device and equipped with more than four speeds and which offers a maximum degree of operational reliability combined with constant readiness for braking.

The ensuing descriptions all relate to a hub of which the single planetary transmission is equipped with stepped planet gears and which is combined with two sun wheels which can be alternately locked. In particular, reference is made here to measures which can prevent the idling of the sun wheels which may possibly occur when the sun wheels are shifted and which can have an adverse effect on the functioning reliability of the multi-speed hub.

Furthermore, the ensuing description of special structural elements will reveal solutions to the problem of how, for the user of such hubs, handling can be substantially simplified by the use of only one gear shift control which exercises its controlling function on the transmission elements from only one side of the hub.

Among these possible solutions, a distinction must be made between several groups. For example, FIGS. 2 to 11 illustrate measures for preventing idling, in fact by positive control in the region of the sun wheels, special developments and designs of coupling elements being provided.

Figure 2B:
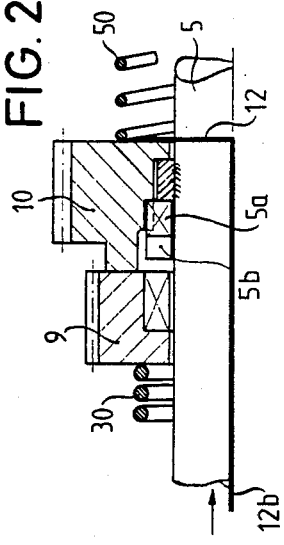
Figure 2B:
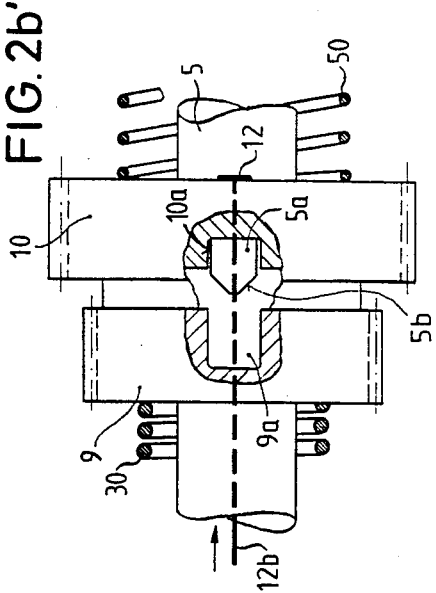
Figure 2A:
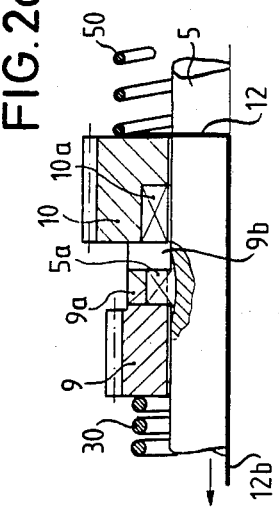
Figure 2A:
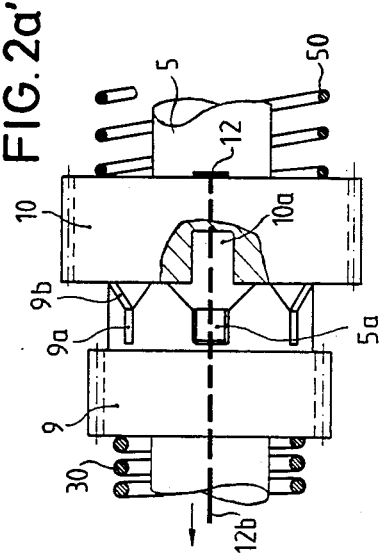

FIGS. 2a and 2a' show a hub shaft 5 provided with a coupling tooth system. The coupling teeth 5a have parallel flanks for engagement into in each case one of the two sun wheels 9, 10 displaceable on the hub shaft. The coupling profile of one of the two sun wheels—in the drawing this is the smaller wheel—is constructed as an axial projection 9a of the sun wheel body and is provided with sloping faces 9b. Upon switchover of the two sun wheels 9, 10, i.e. at an alternate change of the rotationally rigid coupling, there is normally a range in which the coupling teeth cannot engage either of the sun wheels 9 or 10 in order not to jam the transmission. In this transition zone, the oblique faces—in the present case these are provided on the small sn wheel 9—by virtue of the relative rotation of the sun wheels 9, 10 in respect of each other, ensure that in fact the smaller sun wheel 9 is deflected axially leftwardly, while at the same time the larger sun wheel 10 is displaced leftwardly by the force of a spring not shown here and can thus become operatively connected to the coupling teeth 5a of the hub shaft 5. Thus it is by simple means guaranteed that always one of the two sun wheels 9, 10 is coupled to the hub shaft 5 and so the multi-speed hub as such is ready to operate as a driving or braking means.

The sun wheels 9 and 10 are moved by a thrust block 12 which can be pulled leftwards by an actuating cable 12b, against the action of the spring 30. Bearing on the sun wheel 10 is a spring 50 which seeks to push the sun wheel 10 leftwardly. FIGS. 2a and 2a' show that position in which the sun wheel 9 is fixed in non-rotatable manner in relation to the hub shaft 5 by engagement of the coupling teeth 5a into the axially parallel dog flanks 9a, so that the sun wheel 9 operates as a part of the planetary transmission whereas the sun wheel 10 is free to continue turning. When the shift cable 12 is pulled leftwards, the two sun wheels 9 and 10 are jointly displaced sufficiently leftwards that the tooth gaps 10a fully accommodate the coupling teeth 5a so that the shift position is reached in which the sun wheel 10 becomes operative as a part of the planetary transmission while the sun wheel 9 is free to rotate. It must be adopted as the premise that the axial length of the coupling teeth 5a is no more than as great as the axial length of the oblique faces 9b, so that the coupling teeth 5a cannot in any case become simultaneously engaged with the straight flanks 9a and the straight flanks 10a. If, then, in order to change gear, the sun wheels 9 and 10 are displaced leftwards due to an erroneous operation of the actuating cable 12b, the flanks 10a do not come into engagement with the coupling teeth 5a while on the other hand the coupling teeth 5a are no longer in engagement with the flanks 9a, then this is not a mishap: if, then, rotation of the driver causes the planetary transmission to rotate, then the sun wheel 9 is displaced leftwardly by co-operation of the coupling teeth 5a with the oblique flanks 9b against the action of the relatively hard spring 30. Then the sun wheel 10 under the action of the softer spring 50 can move leftwards so that the flanks 10a then come into engagement with the coupling teeth 5a so that now, too, one of the sun wheels 9, 10, in fact the sun wheel 10, is again secured against rotation on the hub shaft 5 so that the planetary transmission becomes effectively torque transmitting, i.e. both the driving moment and in particular also a braking moment can be transmitted. When displacement of the sun wheels 9 and 10 leftwards has proceeded sufficiently far that the tooth gaps 10a only partially accommodate the coupling teeth 5a, then by the alternate action of the coupling teeth 5a with the oblique flanks 9b, the sun wheel 9 is likewise displaced leftwards and the sun wheel 10 can follow leftwards until such time as the coupling teeth 5a are completely housed by the tooth gaps 10a in an axial direction.

The situation shown in FIGS. 2a and 2a' has been brought about by the fact that the shift cable 12b has been released rightwards. If, thereby, the situation according to FIGS. 2 and 2a' has been reached, then everything is in order: the sun wheel 9 is rotationally rigidly mounted on the hub shaft 5 and the sun wheel 10 can turn freely. If by reason of some maladjustment of the shift cable 12b, the sun wheel 9 has not reached the position shown in FIGS. 2a and 2a', so that the coupling teeth 5a are only slightly axially coincident with the stright flanks 9a, then the sun wheel 9 is nevertheless operative as part of the planetary transmission and the sun wheel 10 is free to rotate. If, then, due to an overloading of those parts of the coupling teeth 5a and straight flanks 9a which only overlap slightly, deformation occurs in these zones and results in the sun wheel 9 being no longer rotationally rigid, then the coupling teeth 5a again come into engagement with the oblique flanks 9b. Then, by co-operation of the coupling teeth 5a with the flanks 9b, the sun wheel 9 is again displaced leftwardly so that the sun wheel 10 can through flanks 10a again engage the coupling teeth 5a so that the sun wheel 10 is again operative as part of the planetary transmission. This ensures that even with maladjustment of the shift cable 12b (which naturally should always be put right as quickly as possible in order to avoid excessive strain on parts of the transmission), always one of the sun wheels 9, 10 will be operative as part of the planetary transmission, so that in other words a driving moment and in particular also a braking moment can at all times be transmitted.

FIGS. 2b and 2b' illustrate an embodiment similar to that in FIGS. 2a and 2a' but here the oblique faces which are designed to bring about positive deflection of in each case one of the two sun wheels 9, 10 in the transmission zone—in the drawing which is the smaller sun wheel 9—are located on the coupling teeth 5a of a component which is rigidly connected to the hub shaft 5 and which annularly encloses the hub shaft.

The alternative embodiments described in FIGS. 2a, 2a' and 2b, 2b' have the advantage that only a single coupling tooth system 5a is required on the hub shaft 5. The arrangement shown in FIGS. 2b and 2b' behaves in exactly the same way as that shown in FIGS. 2a and 2a', only the oblique faces 5b now being provided on the shift tooth 5a.

Figure 3:
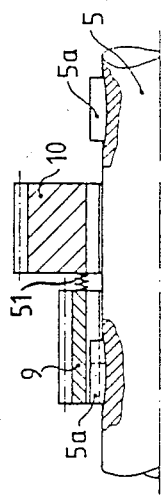
Figure 3A:
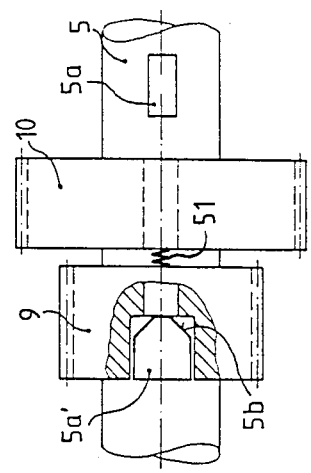

FIGS. 3 and 3a show an arrangement in which the two sun wheels 9 and 10 are, for gear changing, displaced between the two coupling tooth systems 5a on the hub shaft 5 and in this way each sun wheel 9, 10 can be brought into engagement with the coupling tooth system 9a or 10a provided for it. Avoidance of idling in the transmission zone between the individual gear shift stages is again brought about by oblique shift faces which are integrally moulded on the coupling profile of one of the sun wheels 9, 10—in the drawing it is the smaller sun wheel 9, 9b.

The premise adopted for FIGS. 3 and 3a is that the spring 50 is stronger than the spring 30 and that the two sun wheels 9, 10 are displaced rightwards by the gear shift device against the thrust of the spring 50. The behaviour of the arrangement shown in FIGS. 3 and 3a by virtue of the oblique flanks 9b corresponds to the behaviour of the embodiment shown in FIGS. 2a and 2a'. One particular feature which by reason of the interaction of the two sun wheels 9 and 10 with various coupling teeth 5a and 5a' in the presence of a thrust spring 51 between the two sun wheels 9 and 10. When the gears are shifted from the position shown in FIGS. 3 and 3a to a position in which the coupling teeth 5a' engage the coupling teeth 10a, then a case could well occur whereby the axially directed end faces of the coupling teeth 10a abut axial end faces on the coupling teeth 5a' so that the sun wheel 10 cannot be coupled to the coupling teeth 5a'. Then the sun wheels 9 and 10 draw close to each other briefly, accompanied by compression of the spring 51 until by reason of the further rotation of the planetary transmission, the coupling teeth 5a' can under the pressure of the compressed spring 51, jump into the coupling teeth 10a.

Figure 4:
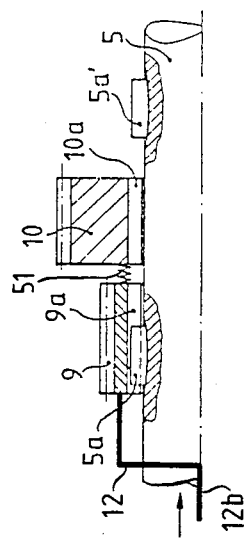
Figure 4A:
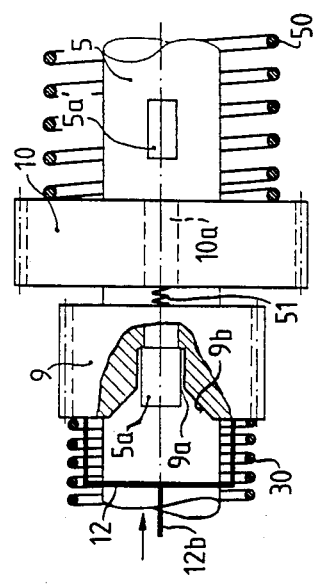

FIGS. 4 and 4a show an example of embodiment, the mode of functioning of which is similar to that of the arrangement described with reference to FIGS. 3 and 3a. In contrast to the embodiment according to FIGS. 3 and 3a, in this case the deflecting faces 5b are for positive displacement of the sun wheels 9, 10 disposed on one of the two coupling tooth systems 5a, 5a' on the hub shaft 5—in the drawing, on the tooth system 5b provided for the smaller sun wheel 9.

The embodiments described in FIGS. 3, 3a and 4, 4a have the advantage that each of the axially extending tooth systems 5a can be attuned especially for optimum coupling with the relevant sun wheel 9 or 10.

Figure 5:
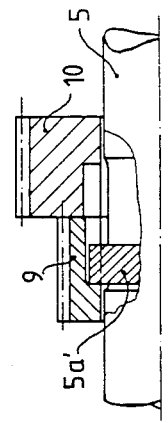
Figure 5A:
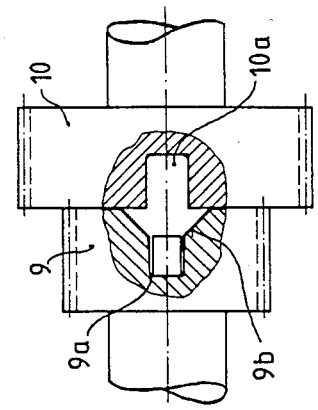

FIGS. 5 and 5a show an example of embodiment in which the two sun wheels 9, 10 are axially secured in a manner not shown in greater dtail. For gear shifting, an axially displaceable coupling elelment disposed in the region between the sun wheels 9 and 10 is brought into engagement with the internal profile of whichever sun wheel 9 or 10 is to be engaged.

In the transition zone between the gears, the oblique faces 9b, 10b on the coupling profile 9a, 10a of one of the two sun wheels 9, 10 produce deflection and positive engagement into the other sun wheel 9, 10.

Figure 6:
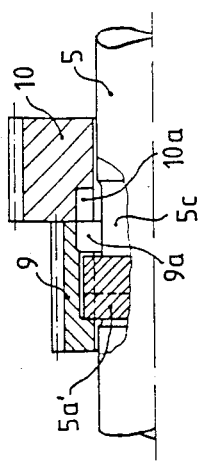
Figure 6A:
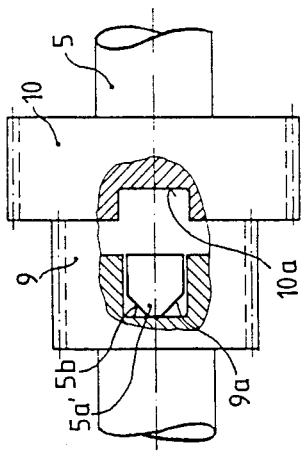

FIG. 6 shows an embodiment which is largely identical to that shown in FIGS. 5 and 5a. Only the sloping faces which bring about the positive coupling are located on the coupling element 5a', 5b instead of on the sun wheels and face one of the two sun wheels 9, 10.

Figure 7:
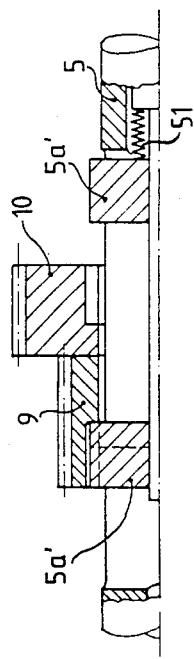
Figure 8:
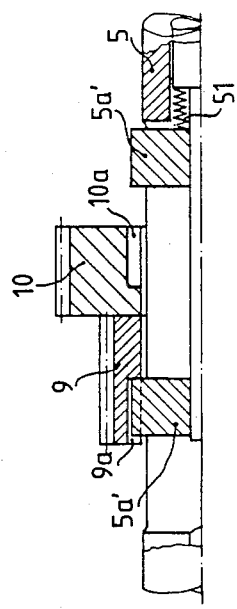
Figure 8A:
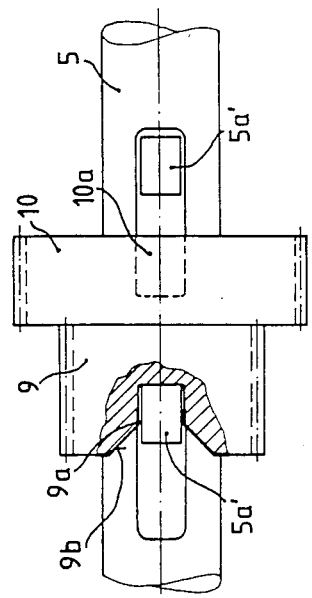

FIGS. 7 and 8 each show an alternative embodiment with axially locked sun wheels 9, 10, Two coupling elements are displaceable on the hub shaft 5. For gear changing, the coupling elements 5a' located outside the sun wheel package 9/10 are alternately engaged with one or other sun wheel-coupling profile 9a, 10a.

In the embodiment shown in FIGS. 7, 7a, 8, 8a, the thrust spring 51 again takes over the function of the thrust spring 51 as in the embodiment shown in FIGS. 3 and 3a.

Figure 7A:
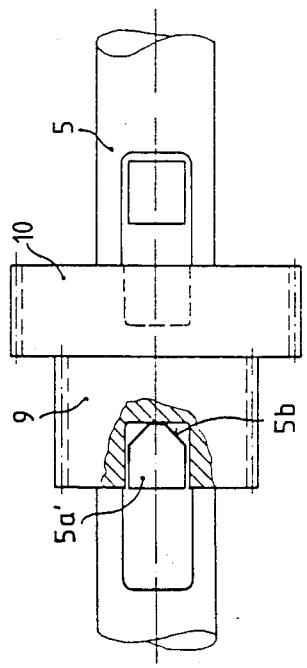

The oblique switching surfaces 9b for positive gear changing in the transition zone are, in the embodiment shown in FIGS. 7 and 7a, disposed on the internal profile of one of the two sun wheels 9 while in the embodiment shown in FIG. 8 they are on one of the two coupling elements 5a', 5b.

Figure 9:
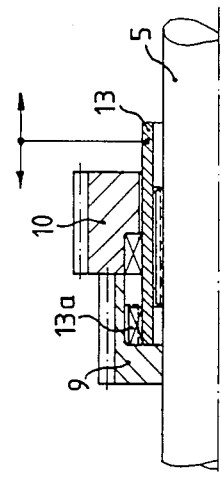

FIG. 9 illustrates an embodiment in which, in the region between the sun wheels 9 and 10 and disposed on a rotationally rigid sliding sleeve 13, there is a coupling tooth system 13a for alternately locking one of the two sun wheels 9, 10. The sun wheels 9, 10 are axially rigid.

Figure 9A:
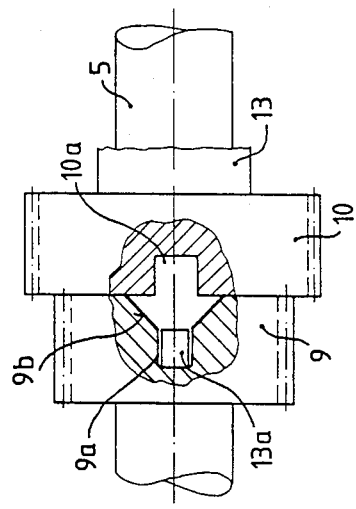

One of the sun wheels—in the figure, it is the smaller sun wheel 9—is mounted on the hub shaft 5 while the other sun wheel 10 is mounted on the sliding sleeve 13, the latter being rotationally rigidly but axially displaceably disposed on the hub shaft. To avoid idling between gears, the coupling teeth on one of the sun wheels 9, 10 are provided with sloping deflector faces 9b, as shown in FIG. 9a. It is however also possible for the coupling teeth 9a, 10a on the sun wheels 9, 10 to be parallel in construction and for the sloping deflector faces which can point axially leftwards or rightwards to be located on the coupling teeth 13a of the sliding sleeve 13.

Figure 11:
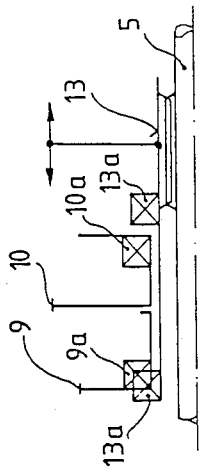
Figure 10:
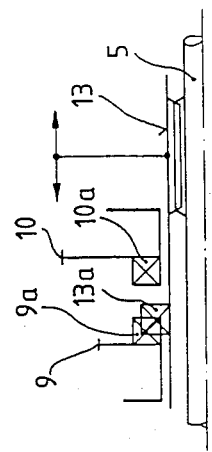

FIGS. 10 and 11 show in each case an embodiment in which the axially fixed sun wheels 9, 10 are mounted on a rotationally rigid sliding sleeve 13, this sliding sleeve 13 being rotationally rigid but axially displaceable on the hub shaft 5.

The coupling teeth of the sliding sleeve 13 for engagement into the internal profiles 9a, 10a of the sun wheels 9, 10 are in FIG. 10 provided axially between the sun wheels while in FIG. 11 the coupling teeth 13a are provided on the sliding sleeve 13 and axially outside the sun wheels 9 and 10. By shifting the sliding sleeve 13 axially leftwards or rightwards on the hub shaft 5, it is possible optionally to couple the large or the small sun wheel, 9 or 10 as the case may be, in rotationally rigid fashion to the hub shaft 5. To avoid idling between gears, either the coupling profile 9a, 10a of one of the sun wheels 9, 10 or the coupling teeth 13a of the sliding sleeve 13 may be equipped with sloping deflector faces.

FIGS. 12 to 21 show systems which serve to shift the two sun wheels, at the same time preventing the possibility of engaging positions between gears which may give rise to idling.

Figure 12:
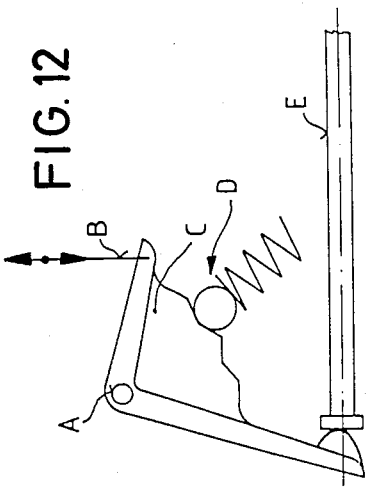

FIG. 12 shows a control lever A which is actuated by a push-pull shift assembly B and which has on a cam C a catch D which only permits of such shift positions as produce in the gear hub the envisaged functionally reliable coincident relationships between the hub shaft and the sun wheels which are alternately coupled.

Figure 13:
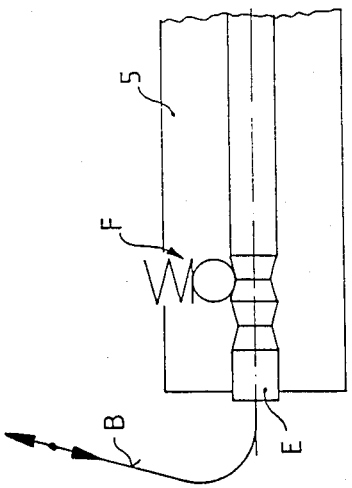

FIG. 13 shows a shift rod E which is locked to the hub shaft 5 by catch means, using a series of ratchet notches which can, for example, co-operate with a ball catch F. Actuation of the shift rod E is via a push-pull operating cable B, the catch F not permitting of any function-upsetting intermediate positions. The catch can also be provided on a component which is fixed on the shaft. FIGS. 14 and 15 show two alternatives wherein in each case one of the sun wheels 9, 10 which are in themselves axially displaceable can be locked by catch means either with the hub shaft 5 or with the planet carrier 6, by means of catch elements G or H.

Figure 18:
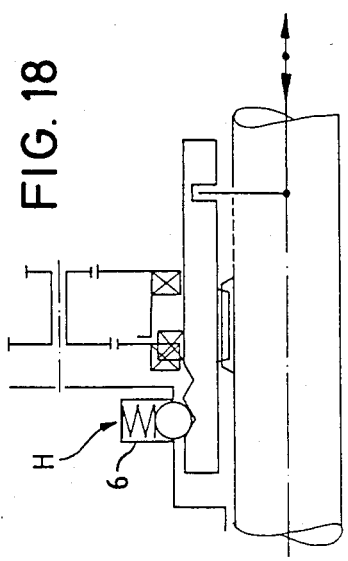

FIGS. 16, 17 and 18 illustrate gear shift systems in which a rotationally rigid but axially displaceable sliding sleeve 13 is locked on the hub shaft by catch means.

In FIG. 16, this catch-locked engagement is between the sliding sleeve 13 and one of the axially fixed sun wheels 9, 10.

In the view shown in FIG. 17, catch engagement is towards the hub shaft 5 while in the view in FIG. 18 it is towards the planet carrier 6.

Figure 19:
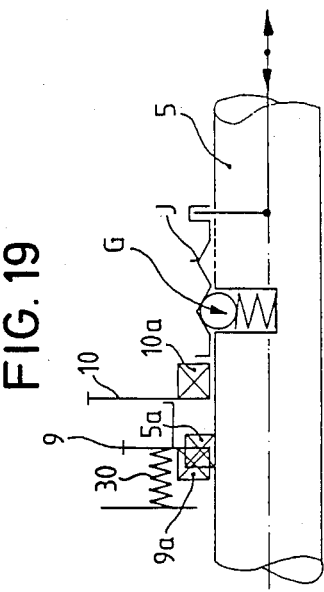
FIGS. 19 and 20 show alternative forms of the embodiments according to FIGS. 16 to 18 in which now for gear shifting of the sun wheels which are mounted for axial displacement on the hub shaft, an auxiliary sleeve is used which is in turn capable of being locked by ratchet means on the hub shaft or planet carrier.
Figure 20:
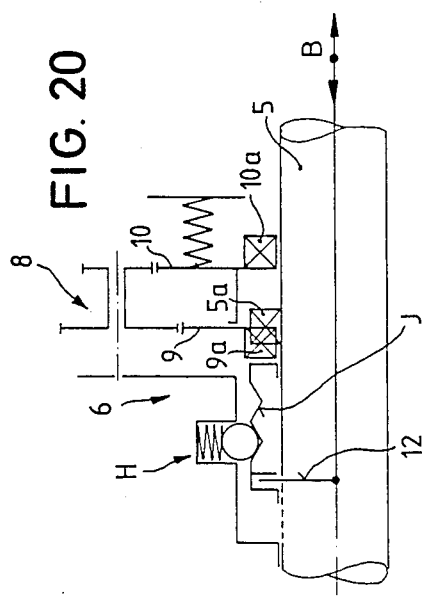

FIGS. 19 and 20 show alternative embodiments in which for shifting the sun wheels 9, 10 which are mounted for displacement on the hub shaft 5, an auxiliary sleeve 1 is used and is locked by catch means on the hub shaft 5 or on the planet carrier 6.

Figure 21:
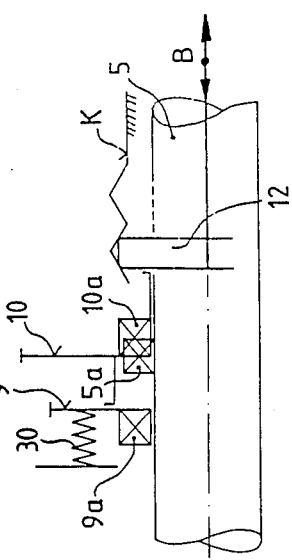
FIG. 21 shows an arrangement in which with axially displaceable sun wheels the thrust block engages the hub shaft itself in order to establish the functionally correct gear shift paths.

FIG. 21 represents an arrangement in which the thrust block 12 itself engages in an axially fixed spring element K in order to determine the correct amount of shift travel. The sun wheels 9 and 10 are axially displaceable in respect of the hub shaft 5 which in turn has coupling teeth 5a to cooperate with the coupling faces 9a, 10a. The thrust block 12 can thereby act on a sliding sleeve 13, an auxiliary sleeve 1 or, as shown, directly on the sun wheels 9, 10. As with all the other aforementioned systems, this arrangement is also operated through a push-pull shift cable B.

FIGS. 22 to 26 illustrate gear shift systems which have to be switched in one direction only and in this way make it possible to construct a hub with just one operating table assembly or one shift rod as the control element.

FIG. 22 shows an embodiment in which the hub shaft is equipped with three sets of coupling teeth 5a located at a certain distance from one another. The two axially displaceable sun wheels 9 and 10 which are mounted on the hub shaft have in turn coupling teeth 9a, 10a which can be optionally engaged with the coupling teeth 5a on the hub shaft 5. In this case, gear changing is effected as follows: In the starting position—as shown, for example, in FIG. 22—the larger sun wheel 10 is copled to the axially central set of hub shaft teeth 5a. For the first gear change from 5th to 4th gear, the thrust block 12 is displaced sufficiently rightwards axially that by the force of the indicated spring 30 the larger sun wheel 10 is disengaged and at the same time the smaller sun wheel 9 is engaged into the axially left-hand teeth 5a. In 3rd and 2nd gear, the position of the sun wheels 9, 10 remains unchanged.

By further displacement of the thrust block 12 axially rightwards, the small sun wheel 9 is disengaged from the central set of teeth 5a on the hub shaft 5 and the large sun wheel engages the axially right-hand coupling teeth 5a on the hub shaft 5 to producue 1st gear. The gear stages are shifted in one direction of the thrust block 12.

FIG. 23 shows another arrangement which comprises not only the axially displaceable sun wheels 9 and 10 but a sliding sleeve 13 equipped with two sets of coupling teeth 13a for engagement into the sun wheels 9 or 10 and having an internal profile 13' for rotationally rigid coupling to the hub shaft 5. One of the sun wheels—in the drawing it is the smaller sun wheel 9—is mounted on the hub shaft 5 while the other sun wheel 10 is mounted on the sliding sleeve 13.

The shifting process is as follows:

In the starting position (FIG. 23=5th gear), the large sun wheel 10 has its coupling profile 10a in engagement with the axially right-hand coupling teeth 13a on the sliding sleeve 13. If the thrust block 12 is now moved axially rightwards, the spring 30 shown moves the small sun wheel 9 rightwards and into operative connection with the left-hand coupling teeth 13a on the sliding sleeve 13, thereby disengaging the coupling connection between the large sun wheel 10 and the sliding sleeve 13. In 3rd and 2nd gears, the position of the sun wheels 9, 10 remains unaltered. By once again shifting the thrust block axially rightwards, now, the sliding sleeve by virtue of the thrust block 12 abutting on the axially right-hand limit of the longitudinal slot 13c in the sliding sleeve 13, the sliding sleeve 13 is displaced also. When this happens, the coupling connection between the small sun wheel 9 and the sliding sleeve 13 becomes disengaged, while at the same time the large sun wheel 10 again enters into an operative connection with the sliding sleeve 13, corresponding to the position for 1st gear. In this embodiment, gear shift actuation takes place in an axial direction.

FIG. 24 shows a construction equipped with a sliding sleeve 13 which is rotationally rigidly but axially displaceably connected to the hub shaft 5 and which has two sets of coupling teeth 13a for engagement into the coupling profiles 9a, 10a of the sun wheels 9, 10. The two sun wheels 9 and 10 are rotatably but axially immovably mounted in the planet carrier and on this sliding sleeve 13. From the starting position—as shown for instance in FIG. 24—in which the large sun wheel 10 co-operates with the axially right-hand coupling teeth 13a of the sliding sleeve 13, the sliding sleeve is shifted axially rightwards via the thrust block 12. When this happens, the axially left-hand coupling teeth 13a on the sliding sleeve connect with the small sun wheel 9 while the connection between the large sun wheel 10 and the sliding sleeve 13 is disengaged.

By once again shifting the sliding sleeve 13 onwards axially by means of the thrust block 12 and in the same direction, the left-hand coupling teeth 13a become disengaged from the small wheel 9 and re-engage the coupling profile 10a on the large sun wheel 10.

In the case of the arrangements shown in FIGS. 22, 23 and 24, in order to avoid idling between gears, as described already with reference to FIGS. 1 to 8, the coupling teeth 5a on the hub shaft 5, the coupling teeth 13a on the sliding sleeve 13 or the internal profiles 9a, 10a on the sun wheels may be provided with sloping faces for positive control of coupling engagement. Furthermore, precautions such as are described in connection with FIG. 9 and with reference to the sliding sleeve 13 can be taken in conjunction with the arrangements according to FIGS. 22, 23 and 24 to prevent idling between gears.

FIGS. 25 and 26 each show a system in which by means of a lever K or also by a rising tooth system, a reversal of the direction of movement of a special control sleeve S can be achieved.

In the basic position, the large sun wheel 10 engages the coupling teeth 5a on the hub shaft 5. By shifting the thrust block 12 axially rightwards, the spring 30 which is shown engages the small sun wheel 9 into the shaft teeth 5a and aat the same time the connection between the hub shaft 5 and the large sun wheel 10 is disengaged. Further axially rightwards shifting results—in the development shown in FIG. 25—in the sliding sleeve 13' striking the tilting lever K which pushes the control sleeve 5 axially leftwards and with it also the large sun wheel 10 which thus engages the teeth 5a once again, while the sun wheel 9 is pushed against the spring 30 out of coupling engagement with the teeth 5a. A thrust block or a displaceable clutch wheel may serve as the shifting element for the tilting lever K.

In FIG. 26, the sliding sleeve 13' strikes a rising tooth element T which rotates thereby and so displaces the control sleeve S in an axially leftwards direction. Thus, the connection of the small sun wheel 9 with the shaft 5, 5a is disengaged again and the large sun wheel 10, by corresponding displacement, becomes re-engaged with the hub shaft 5. By virtue of the rising tooth arrangement T, shifting is necessary in only one direction.

The mode of action in FIG. 26 can be imagined to be as follows: when the sliding sleeve 13' moves rightwards, encountering the ring T which surrounds the hub shaft, the non-rotatable sleeve 13' causes rotation of the ring T about the hub shaft through a first pairing of (not shown) screwthread-like co-operating projections on the sleeve 13' and on the ring T. Between the control sleeve S and the ring T is a further pairing of screwthread-like co-operating projections which, upon the previously described rotation of the ring T, bring about a leftwards displacement of the control sleeve S.

In FIGS. 27 and 28 there are shown examples of embodiment of a gear shift hub offering more than three speeds and a back-pedalling brake device wherein the aforedescribed special component elements can be expediently employed.

FIG. 27 envisages actuation by means of two cables 12b and 12b'. In FIG. 27, the hub is set for the next-to-top fast gear (4th gear) because the small sun wheel 9 is via the coupling elements 9a, 5a rotationally rigid on the hub shaft 5. If the operating cable 12b' is pulled leftwards, the large sun wheel 10 together with the coupling element 10a can be displaced leftwards so that the coupling element 10a engages into the coupling element 5a while the coupling element 9a is pushed leftwards out of the coupling element 5a, in fact with the help of the projection 53. Thus, the first high speed gear (5th gear) is reached in which the large sun wheel 10 is locked on the hub shaft. To shift from 4th to 3rd and from 3rd to 2nd gears, adopting the premise of the 4th gear shown in FIG. 27, the right-hand operating cable 12b is pulled as in the examples shown in FIG. 1. To change to 1st gear, while the operating cable 12b is being fully pulled, the operating cable 12b' is pulled leftwards so that the large sun wheel 10 is again rotationally rigidly coupled with the hub shaft 5. With this embodiment shown in FIG. 27, it is possible to use an arrangement of sloping surfaces such as is shown, for example, in FIGS. 2a and 2a'.

FIG. 28 shows a further example of embodiment of 5-speed back-pedalling brake hub in the position required for 5th gear, in which the sun wheels 9 and 10 are mounted on a rotationally rigid sliding sleeve 13 but are however axially fixed on the planet carrier. The coupling 14 between the planet carrier 6, the internal gear 11 and the driver 3 is likewise known from 3-speed hubs. With this hub, gears are changed likewise in one direction only and in fact in the following way: by pulling on the single operating cable 12b, both thrust blocks 12 and 12' and, under the action of the spring 30, the sliding sleeve 13 are displaced sufficiently rightwards axially that the large sun wheel 10 on the sliding sleeve 13 becomes disengaged while the small sun wheel 9 becomes engaged by means of the elements 91a/13a—4th gear.

Onwards shifting, i.e. pulling on the operating cable in the previous direction, breaks the connection between the coupling wheel 14, which is stil engaging the driver 3, and the planet carrier 6 while at the same time the internal gear 11 is connected to the coupling wheel 14—3rd gear. If the thrust blocks 12, 12' are pulled still further axially rightwards, the internal gear locking detents 19 become disengaged from the hub sleeve 1 via the oblique switching surfaces 1c and the axially right-hand thrust block 12' comes to rest in the slot 5b—2nd gear.

If the operating cable 12b is now pulled out of the hub shaft 5 against the tension of spring F until the thrust block 12 abuts the thrust block 12', the thrust block 12 on the left-hand side drives the sliding sleeve 13 axially rightwards with it, thereby disengaging the previously existing coupling 9a/13a between the small sun wheel 9 and the sliding sleeve 13 while the sliding sleeve 13 is now engaged again into the large sun wheel 10, by means of the elements 10a/13a—1st gear.

The brake device R which can be actuated by rearwards rotation of the driver 3 is, in its simple construction, already known from 3-speed shift hubs so that no separate description of the brake device is required here.

The examples of embodiment of a 5-speed hub according to FIGS. 1, 27 and 28 can, by omitting the brake device R, also be constructed as freewheeling hubs, the advantage of the hub design of being always ready for driving capability is fully retained even in positions between the gear shift stages.

Supplemental to the construction according to FIG. 24, another alternative embodiment will be explained now with reference to FIG. 24a which shows an arrangement in which the two sun wheels 9 and 10 are rotatable on the hub shaft 5 but are axially fixed.

Two axially displaceable and in themselves rotationally rigid coupling elements 13 and 13a are so disposed on the hub shaft 5 that by a shifting operation, for example employing thrust blocks 12 and 12a, which are axially displaceable and connected to each other in the hub shaft, in each case one of the sun wheels 9, 10 can be locked on the hub shaft 5 with one of the coupling elements 13 or 13a according to the associated gear shift stage. Gear shift actuation occurs thereby in just one axial direction.

FIG. 24a shows the embodiment in the gear shift setting for 5th gear. For shifting to 4th gear, the thrust block system 12/12a is pulled axially rightwards so that the sun wheel 10 is released from the coupling face 13 but the sun wheel 9 on the other hand is rotationally rigidly coupled to the hub shaft 5 by the coupling face 13a. This coupling position exists also with the as yet not mentioned gear shift settings for 3rd and 2nd gears.

For the 1st gear position, the thrust block system 12/12a is moved on in the same axial direction so that the sun wheel 9 has its coupling face 9a released from the coupling element 13a while the sun wheel 10 on the other hand has its coupling face 10a coupled with the coupling element 13a so that it is now rigidly connected to the hub shaft 5. The coupling element 13 which was operative in the illustrated 5th gear position is now axially far removed from the sun wheel 10 and is inoperative from the point of view of establishing a coupling connection.

Upon actuation of the gear shift in only one axial direction, the sequence of functions is that firstly the large sun wheel 10, then the small sun wheel 9 and finally once again the large sun wheel 10 is held in rotationally rigid manner. This can take place on the one hand in that by means of the aforesaid thrust block arrangement one or other sun wheel is rotationally rigidly and directly connected to the hub shaft 5. It is also possible to dispose on the hub shaft 5 a rotationally rigid so-called sliding sleeve 13 with which then the sun wheels can be alternately rotationally rigidly connected in the sequence described hereinabove so that for the system of stepped planet gears not shown here the appropriate engagement conditions arise by which the differing gear shift stages are achieved in the hub transmission.

Furthermore, it can be very advantageous for reliable coupling engagement if the coupling faces on the sun wheels and on the coupling means which serve for locking purposes are not provided with parallel flanks but with back-tapered coupling faces so that, for example, a so-called dovetail shape is formed.

Finally, in the case of a hub according to FIG. 1, for example, it may also be conductive to favourable functioning if the coupling bush 14 which is on the one hand axially in constant engagement with the internally cut teeth 3b of the driver 3 is substantially helical on its corresponding teeth 14b, in which case also the internally cut teeth 3b in the driver 3 will be correspondingly helical in construction.

FIG. 29 is a diagrammatic view of the construction of sun wheels 109 and 110 together with the coupling means which serve to lock in each case one of the sun wheels 109 and 110 in rotationally rigid fashion on the hub shaft 105. A construction as is shown in FIG. 29 could be used in the construction according to FIG. 1.

Also with the embodiment shown in FIG. 29, actuation from the right using a single operating cable 112a is illustrated. The development of planetary transmission and the optional connection of the coupling bush 14 to the planet carrier and the internal gear occur exactly as shown in FIG. 1.

In FIG. 29, the sun wheels 109 and 110 bear axially on each other and are initially tensioned rightwardly by the thurst spring 130 which is softer than the thrust spring 128. FIG. 29 corresponds to the position appropriate to 5th gear (high speed gear) and to that extent it corresponds to FIG. 1. In FIG. 29, the sun wheel 110 has its internally cut teeth 110a in engagement with the straight dogs 113b of the sliding sleeve 113, while the sliding sleeve 113 is rotationally rigidly locked on the hub shaft 105 by the coupling dogs 105a. The sun wheel 109 is freely rotatable on the hub shaft 105. When changing from the 5th gear (high speed gear) shown in FIG. 29 to 4th gear (next-to-top gear), then by means of the cable 112a, the thrust block 112 and with it the intermediate sleeve 129 are displaced rightwards against the action of the stronger coil thrust spring 128 so that under the action of the coil thrust spring 130 the two sun wheels 109 and 110 can move rightwards following the intermediate sleeve 129 until the sun wheel 110 comes to bear on the plate 116. As this happens, the internally cut teeth 110a become disengaged from the coupling dogs 113b and the coupling teeth 109a engage the coupling dogs 113b. As a result, now, the sun wheel 109 is non-rotatably locked on the hub shaft 105 via the sliding sleeve 113 while the sun wheel 110 is freely rotatable in relation to the sliding sleeve 113. If by reason of some maladjustment, a situation should arise where the sun wheel 110 is not displaced until it abuts the stop 116 and therefore the coupling teeth 109a cannot engage the coupling dogs 113b, then the internally cut teeth 110a will now engage the oblique faces 113ba of the coupling dogs 113b; in consequence, now, the sun wheel 110, as it performs its rotary motion, will by reason of the planetary transmission rotating, be displaced rightwards by the alternate action of the internally cut teeth 110a with the oblique faces 113ba against the action of the coil thrust spring 128, approximately as far as abutment with the plate 116. Then, however, under the action of the coil thrust spring 130, the sun wheel 109 is able to follow the sun wheel 110 and now reliably connect with the sliding sleeve 113 in that the internally cut teeth 109a engage the axially extending partial faces of the coupling dogs 113b. Thus, with this embodiment as well, it is ensured that under any circumstances one of the sun wheels 109, 110 is rotationally rigid on the sliding sleeve 113 and thus rotationally rigid on the hub shaft 105.

When in order to change back from the 4th gear position to the 5th gear position shown in FIG. 29 the actuating cable 112a is released leftwards so that the sun wheel 110 is not displaced leftwards by the intermediate sleeve 129 as far as the proper position, then once again a situation can arise where the internally cut teeth 110a do not axially coincide sufficiently with the straight portions of the coupling dogs 113b. If, then, in course of time, deformation creates a situation where the sun wheel 110 is no longer rotationally rigidly fixed on the coupling dogs 113b, then the internally cut teeth 110a again come into engagement with the sloping faces 113ba. As a result, the sun wheel 110 is again displaced rightwards and now the internally cut teeth 109a on the sun wheel 109 again engage the coupling dogs 113b. Thus, in this situation, too, it is again guaranteed that at any time one of the sun wheels 109, 110 will be rotationally rigidly locked and thus becomes an effective reaction link in the planetary transmission.

It should be noted that in the case of the embodiment shown in FIGS. 2 to 9 and 29 the displacement of one sun wheel or coupling dog which is brought about by the sloping surfaces must always occur in such a direction that the tension on the actuating cable is relieved so that it is not over-stressed. Alternatively, it might be conceivable to incorporate into the acutating cable an elastic compensating member which is stressed by displacement of the sun wheel or coupling dog.

In the case of the embodiment shown in FIG. 29, the sloping faces 113ba can also fulfil their protective function when the gears are changed from 2nd gear to 1st gear (see description of FIG. 1). The sun wheels 109 and 110 then bear on the plate 116 and the sun wheel 109 is coupled with the sliding sleeve 113. If, now, the sliding sleeve 113 is pulled farther rightwards as the result of a gear change, then the coupling dogs 113b again engage the internally cut teeth 110a on the sun wheel 110. If the displacement of the sliding sleeve 113 rightwards is not sufficient to produce a proper engagement of the coupling dog 113b with the internally cut teeth 110a, then the internally cut teeth 110a engage the oblique faces 113ba and the sun wheel 110 is displaced farther rightwards. This further displacement of the sun wheel 110 rightwards is made possible in that the plate 116 is biased by a coil thrust spring 152 and can yield rightwards to the necessary degree. Then once again the internally cut teeth 109a of the sun wheel 109 engage the straight portions of the coupling dogs 113b so that then the sun wheel 109 can again fulfil the function of a sun wheel within the framework of the planetary transmission.

What is claimed is:

1. A multi-speed hub for bicycles or the like comprising a hub shaft (5) having an axis, a driver (3) rotatably mounted on aid hub shaft (5), said driver (3) being provided with at least one chain sprocket (3'), a hub sleeve (1) rotatably mounted on said hub shaft (5), planetary gear means within said hub sleeve (1), said planetary gear means including a planet carrier (6) rotatably mounted about said hub shaft (5), at least one planet gear member (8) rotatably mounted on said planet carrier (6), said planet gear member (8) being provided with a large planet gear (8a) and with a small gear (8b), a small sun wheel (9) for meshing engagement with said large planet gear (8a) and a large sun wheel (10) for meshing engagement with said small planet gear (8b), said sun wheels (9, 10) being selectively lockable against rotation about said hub shaft (5), an internal gear (11) rotatably mounted about said hub shaft (5), said internal gear (11) being in meshing engagement with one of said planet gears (8a, 8b), and further comprising a torque transmission member (14) in continuous engagement with said driver (3) and selectively engageable with one of said planet carrier (6) and said internal gear (11) for selective common rotation therewith about said hub shaft (5), first one-way coupling means (19, 1b) between said internal gear (11) and said hub sleeve (1), second one-way coupling means (18, 1a) between said planet carrier (6) and said hub sleeve (1), one single speed-change control means (12c, 12b, 12a) introduced from one single end of said hub shaft (5) into a respective bore (5c) of said hub shaft (5), said speed-change control means (12c, 12b, 12a) being adapted for selectively coupling said torque transmission member (14) with respective ones of said planet carrier (6) and said internal gear (11) and for inactivating said first one-way coupling means (19, 1b), said speed-change control means (12c, 12b, 12c) being connected to at least one thrust block (12) slidably mounted within a slot (5b) of said hub shaft (5) and being movable through a plurality of axially spaced positions in response to operation of said speed-change control means (12c, 12b, 12a), in a fifth axial position of said thrust block (12), which position is at maximum spaced from said one single end of said hub shaft (5), said small sun wheel (9) being free for rotation about said hub shaft (5), said large sun wheel (10) being locked against rotation about said hub shaft (5), said torque transmission member (14) being in torque transmitting engagement with said planet carrier (6), said first one-way coupling means (19, 1b) being active, in a fourth axial position of said control member (12), which is nearer to said one single end of said hub shaft (5), said small sun wheel (9) being locked against rotation about said hub shaft (5), said large sun wheel (10) being freely rotatable about said hub shaft (5), said torque transmission member (14) being still in torque transmitting engagement with said planet carrier (6), said first one-way coupling means (19, 1b) being still active, in a third axial position of said thrust block (12), which is still nearer to said one single end of said hub shaft (5), said small sun wheel (9) being locked against rotation about said hub shaft (5), said large sun wheel (10) being freely rotatable about said hub shaft (5), said torque transmission member (14) being in torque transmitting engagement with said internal gear (11), said first one-way coupling means (19, 1b) being still active.

in a second axial position of said thrust block (12), which is still nearer to said one single end of said hub shaft (5), said small sun wheel (9) being locked against rotation about said hub shaft (5), said large sun wheel (10) being freely rotatable about said hub shaft (5), said torque transmission member (14) being in torque transmitting engagement with said internal gear (11), said first one-way coupling means (19, 1b) being inactivated, in a first axial position of said thrust block (12), which is nearest to said one single end of said hub shaft (5), said small sun wheel (9) being freely rotatable about said hub shaft (5), said large sun wheel (10) being locked against rotation about said hub shaft (5), said torque transmission member (14) being in torque transmission engagement with said internal gear (11), said first one-way coupling means (19, 1b) being inactivated.

2. A multi-speed hub as set forth in claim 1, said thrust block (12) acting onto said torque transmission member (14) and onto a sliding sleeve (13) being responsible for locking and unlocking said sun wheels (9, 10) against rotation about said hub shaft (5) in dependency of the axial position of said sliding sleeve (13), said sliding sleeve (13) being secured against rotation about said hub shaft (5), said thrust block (12) being connected by lost-motion connecting means with said sliding sleeve (13) for common axial movement therewith through a portion of the range of axial movement of said thrust block (12).

3. A multi-speed hub as set forth in claim 2, said sliding sleeve (13) being provided with a longitudinal slot (13c), said thrust block (12) being slidingly movable within said longitudinal slot (13c) of said sliding sleeve (13) and acting onto a closed end of said longitudinal slot (13c) for axially moving said sliding sleeve (13) in axial direction through said portion of the range of axial movement of said thrust block (12).

4. A multi-speed hub as set forth in claim 3, said sliding sleeve (13) having a first group of dogs (13a) for locking said small sun wheel (9) and a second group of dogs (13b) for locking said large sun wheel (10).

5. A multi-speed hub as set forth in claim 4, said first group of dogs (13a) being axially extending dogs and said second group of dogs (13b) being radially extending dogs, both with respect to said sliding sleeve (13).

6. A multi-speed hub as set forth in claim 2, said small and said large sun wheels (9, 10) being axially movable along said hub shaft (5), said sliding sleeve (13) being in substantially equal axial positions in said fifth through second axial positions of said thrust block (12), in said fifth axial position said large sun wheel (10) being axially positioned by said thrust block (12), said small sun wheel (9) being axially positioned by said large sun wheel (10), small sun wheel spring means (30) acting in axial direction onto said small sun wheel (9) and through said small sun wheel (9) onto said large sun wheel (10), in said fourth axial position said large sun wheel (10) being axially shifted to a position defined by one of said planet carrier (6) and said internal gear (11) by the action of said small sun wheel spring means (30) through said small sun wheel (9), and said small sun wheel (9) being also axially shifted and positioned in axial direction by said large sun wheel (10), in said third through first axial positions of said thrust block (12) the axial positions of said large sun wheel (10) and said small sun wheel (9) with respect to said sliding sleeve remaining substantially unchanged, in said first axial position of said thrust block (12) said sliding sleeve (13) being axially shifted with respect to said substantially equal axial positions thereof.

7. A multi-speed hub as set forth in claim 6, said sliding sleeve (13) being axially loaded by sliding sleeve thrust spring means (34) biasing said sliding sleeve (13) towards said substantially equal axial position.

8. A multi-speed hub as set forth in claim 1, said thrust block (12) being spring-loaded by thrust block spring means (28), said thrust block spring means (28) biasing said thrust block (12) towards said first position, said speed-change control means (12c, 12b, 12a) being pulling control means.

9. A multi-speed hub as set forth in claim 1, said internal gear (11) being axially movable in response to axial movement of said torque transmission member (14), in activation of said first one-way coupling means (19, 1b) being responsive to axial movement of said internal gear (11).

10. A multi-speed hub as set forth in claim 9, said internal gear (11) being supported by said driver (3) through internal gear support spring means (36), said torque transmission member (14) acting onto said internal gear (11) through internal gear-shifting spring means (36), said internal gear-shifting spring means (36) being weaker than said internal gear support spring means (36).

11. A multi-speed hub as set forth in claim 1, said torque transmission member (14) being connected with said thrust block (12) by lost-motion connecting means for common axial movement of said torque transmission member (14) through a portion of axial movement of said thrust block (12).

12. A multi-speed hub as set forth in claim 11, said lost-motion connecting means comprising lost-motion thrust spring means (32).

13. Multi-speed hub according to claim 1; characterised in that the sun wheels (9, 10) are mounted independently of each other one directly and the other indirectly on the hub shaft (5) and are rotatable and axially slidable, each comprising coupling elements in the form of one of an axially directed system of teeth (9a) and a radially directed internally cut set of teeth (10a) which serve for alternate cooperation with a sliding sleeve (13, 13', 13a, 13b) which is rotationally rigid on the hub shaft (5, 5a).

14. Multi-speed hub according to claim 1, characterised in that the internal gear (11) which belongs to the planetary gear means is in itself axially displaceable being thereby at one end subject to the tension of a coaxial thrust spring (36) biased on the driver (3) and at the other end serving as a support for a thrust spring (35) acting on the axially displaceable coupling bush (14).

15. Multi-speed hub according to claim 1, characterised in that the sun wheels (9, 10) associated with the planetary gear means equipped with stepped said large and small planet gears are rotatable on the hub shaft (5) and are axially displaceable for alternate rotationally rigid mounting.

16. Multi-speed hub according to claim 1, characterised in that the sun wheels (9, 10) rotatably mounted on the hub shaft (5), while in the hub there are elements for axial fixing against spring tension.

17. Multi-speed hub according to claim 16, characterised in that the sun wheels (9, 10) have in each case for locking purposes a coupling profile in the bearing bore.

18. Multi-speed hub according to claim 17, characterised in that the coupling profile is for rotationally rigid supporting of the sun wheels (9, 10) constructed as an axial projection of the wheel body.

19. Multi-speed hub according to claim 18, characterised in that the coupling profile is in each case provided with surfaces oblique to the direction of engagement, for positive control of at least one axially movable component.

20. Multi-speed hub according to claim 1, characterised in that at least one of the first and second coupling means comprise a sliding sleeve (13) which in itself is rotationally rigid but axially displaceable on the hub shaft (5) having axially directed coupling teeth (13a) with parallel flanks for rotationally rigid coupling of rotatable component parts (e.g. sun wheels (9, 10).

21. Multi-speed hub according to claim 20, characterised in that the sliding sleeve (13) has axially and radially directed coupling teeth (13a, 13b).

22. Multi-speed hub according to claim 20, characterised in that for coupling rotatable components the sliding sleeve is provided with coupling means which are fixed on the sliding sleeve in the form of a separate component part.

23. Multi-speed hub according to claim 20, characterised in that the sliding sleeve is provided with integrated coupling means for coupling the rotatable components.

24. Multi-speed hub according to claim 23, characterised in that the coupling means are located in the region axially between the sun wheels (9, 10) for alternate coupling engagements with in each case one of the sun wheels (9 or 10).

25. Multi-speed hub according to claim 23, characterised in that the coupling means are disposed in the region axially on either side of the sun wheels (9, 10) for alternate coupling engagement into whichever of the neighbouring sun wheels (9 or 10) has to be coupled.

26. A multi-speed hub as set forth in claim 1, said speed-change control means (12c, 12b, 12a) being combined with an auxiliary sleeve for indirect shifting of the sun wheels (9, 10), said auxiliary sleeve being rotatable and axially displaceable on the hub shaft (5).

27. A multi-speed hub as set forth in claim 1, a tilting lever (K) being provided which is subject to the action of said speed-change control means (12c, 12b, 12a), said tilting lever (K) being adapted to secure in different axial positions of said thrust block selectively said large sun wheel (10) and said small sun wheel (9) against rotation about said hub shaft (5).

28. A multi-speed hub as set forth in claim 1, said speed-change control means (12c, 12b, 12a) comprising a control sleeve (S), said control sleeve (S) having a rising tooth arrangement (T), unidirectional movement of the thrust block (12) being transformed through a rotary movement into subsequent oppositely directed movements of a securing system securing respective ones of said sun wheels (9, 10).

29. Multi-speed hub according to claim 1, characterised in that the first and second coupling means are provided with oblique faces for positive control of hub transmission elements which are axially movable in relation to the coupling means.

30. Multi-speed hub according to claim 29, characterised in that the hub transmission elements are themselves provided with oblique faces for positive control by the coupling means which are axially movable in relation to the hub transmission elements.

31. A multi-speed hub for bicycles or the like comprising
 a hub shaft (5) having an axis,
 a driver (3) rotatably mounted on said hub shaft (5), said driver (3) being provided with at least one chain sprocket (3'),
 a hub sleeve (1) rotatably mounted on said hub shaft (5),
 planetary gear means within said hub sleeve (1), said planetary gear means including
  a planet carrier (6) rotatably mounted about said hub shaft (5), at least one planet gear member (8) rotatably mounted on said planet carrier (6), said planet gear member (8) being provided with a large planet gear (8a) and with a small planet gear (8b),
  a small sun wheel (9) for meshing engagement with said large planet gear (8a) and a large sun wheel (10) for meshing engagement with said small planet gear (8b), said sun wheels (9, 10) being selectively lockable against rotation about said hub shaft (5),
  an internal gear (11) rotatably mounted about said hub shaft (5), said internal gear (11) being in meshing engagement with one of said planet gears (8a, 8b),
 and further comprising
 a torque transmission member (14) in continuous engagement with said driver (3) and selectively engageable with one of said planet carrier (6) and said internal gear (11) for selective common rotation therewith about said hub shaft (5),
 first one-way coupling means (19, 1b) between said internal gear (11) and said hub sleeve (1),
 second one-way coupling means (18, 1a) between said planet carrier (6) and said hub sleeve (1),
 one single speed-change control means (12c, 12b, 12a) introduced from one single end of said hub shaft (5) into a respective bore (5c) of said hub shaft (5), said speedchange control means (12c, 12b, 12a) being adapted for selectively locking one of said sun wheels (9, 10), for selectively coupling said torque transmission member (14) with respective ones of said planet carrier (6) and said internal gear (11) and for inactivating said first one-way coupling means (19, 1b).
 said speed-change control means (12c, 12b, 12a) being connected to at least one thrust block (12) slidably mounted within a slot (5b) of said hub shaft (5) and being movable through a plurality of axially spaced positions in response to operation of said speed-change control means (12c, 12b, 12a), said thrust block (12) acting onto said torque transmission member (14) and onto a sliding sleeve (13) surrounding said hub shaft (5), said sliding sleeve (13) being responsible for locking and unlocking said sun wheels (9, 10) against rotation about said hub shaft (5) in dependency of the axial position of said sliding sleeve (13), said sliding sleeve (13) being secured against rotation about said hub shaft (5), said thrust block (12) being connected by lost-motion connecting means with said sliding sleeve (13) for common axial movement therewith through a portion of the range of axial movement of said thrust block (12).

32. A multi-speed hub as set forth in claim 31, said sliding sleeve (13) being spring-loaded by sliding sleeve thrust spring means (34).

33. Multi-speed hub according to claim 32, characterised in that the coupling teeth provided on the sliding sleeve (13) are so constructed that actuation of a gear shift operation takes place in only an axial direction, the functioning sequence requiring first that the large sun wheel (10) which has the greater number of teeth, then the smaller sun wheel (9) and finally once again the large sun wheel (10) be rotationally rigidly connected to the sliding sleeve (13).

34. A multi-speed hub as set forth in claim 31, said sliding sleeve (13) being provided with axially directed dogs (13a) and radially directed dogs (13b) for engagement with respective counter-dogs of the small sun wheel (9) and the large sun wheel (10).

35. A multi-speed hub as set forth in claim 31, said sliding sleeve (13) being provided with oblique engagement faces for engagement with at least one of said sun wheels (9, 10).

36. Multi-speed hub according to claim 35, characterised in that the sliding sleeve (13) is constructed as a concentric mounting for axially displaceable in themselves rotatable and respectively couplable component parts.

37. A multi-speed hub as set forth in claim 31, said sliding sleeve (13) having an outer shape adapted for locking engagement with one of the sun wheels (9, 10).

38. A multi-speed hub as set forth in claim 31, said sliding sleeve having an outer shape for locking engagement with the planet carrier (6), said planet carrier (6) being axially fixed.

39. A multi-speed hub as set forth in claim 31, said sliding sleeve having an inner bore adapted for being locked with respect to the hub shaft (5).

40. A multi-speed hub as set forth in claim 31, said sliding sleeve being lockable on said hub shaft.

41. A multi-speed hub as set forth in claim 31, said sliding sleeve (13) being provided with coupling teeth (13a), said coupling teeth (13a) having back-tapered flanks for engagement with correspondingly shaped rotatable components.

42. A multi-speed hub as set forth in claim 1, or claim 31, said torque transmission member (14) being a coupling bush (14) having coupling teeth (14a, 14b) at both ends thereof, one set of coupling teeth (14a) being engageable with said internal gear (11), another set of coupling teeth (14b) being engageable with said driver (3), said one set of coupling teeth (14a) bearing a projection (15) engageable with said planet carrier (6).

43. Multi-speed hub according to claim 42, characterised in that the coupling bush (14) has an integrated thrust spring (32).

44. Multi-speed hub according to claim 42, characterised in that the torque transmission member (14) with the coupling teeth (14b) which are towards the driver (3) serves for constant engagement in the internally cut teeth (3b) of the driver while the coupling teeth (14a) provided on the axially opposite side, with the drive plate (15) mounted thereon serves for engagement with axial dogs (6b) provided on the planet carrier (6) or alternately the coupling teeth (14a) themselves serve for engagement with coupling teeth (11b) provided on the internal gear (11).

45. Multi-speed hub according to claim 42, characterised in that the coupling teeth provided on the hub shaft (5) are so constructed that actuation of a gear shift operation takes place in only an axial direction, and in that in the functioning sequence it is first the large sun wheel (10) then the small sun wheel (9) and finally once again the large sun wheel (10) which has the greater number of teeth which is rotationally rigidly connected to the hub shaft.

46. A multi-speed hub as set forth in claim 1 or claim 31, another thrust block (16) engaging an intermediate sleeve (29) for common axial movement with said at least one thrust block (12), said intermediate sleeve (29) acting as an abutment sleeve for said large sun wheel (10).

47. A multi-speed hub as set forth in claim 1 or claim 31, an intermediate plate (16) being mounted on the planet carrier (6), said planet carrier (6) being axially fixed within said hub sleeve (1), said intermediate plate (16) acting as an axial abutment for the large sun wheel (10) and for the torque transmission member (14).

48. A multi-speed hub as set forth in claim 1 or claim 31, said planet carrier (6) being provided with axially directed dogs (6b) for engagement with said torque transmission member (14), said axially directed dogs (6b) of said planet carrier (6) having roof-shaped sloping surfaces (6c).

49. A multi-speed hub as set forth in claim 1 or claim 31, said hub shaft (5) being provided with radial dogs (5a) for securing said sliding sleeve (13) against rotation about said hub shaft (5).

50. A multi-speed hub as set forth in claim 1 or claim 31, said sliding sleeve (13) being provided with a first group of dogs (13a) for engagement with said small sun wheel (9) and a second group of dogs (13b) for engagement with said large sun wheel (10), at least one of said dogs being provided with oblique engagement faces for engaging respective counter-dots (9a, 10a) of said small sun wheel (9) and said large sun wheel (10).

51. A multi-speed hub as set forth in claim 1 or claim 31, said first one-way coupling means (19, 1b) between said internal gear (11) and said hub sleeve (1) comprising at least one pawl (19) on said internal gear (11) engaging a ratchet (1b) on said hub sleeve (1), said pawl (19) being adapted for limited displacement with respect to said internal gear (11) in a peripheral direction about said hub shaft (5).

52. A multi-speed hub as set forth in claim 1 or claim 31, a brake device being located inside the hub sleeve (1) and adapted to be operated by reverse rotation of the driver (3).

53. A multi-speed hub as set forth in claim 1, or claim 31, said sliding sleeve (13) being secured against rotation about said hub shaft (5) by at least one coupling tooth (5a) integral with the hub shaft (5).

54. A multi-speed hub as set forth in claim 31, said sliding sleeve (13) being secured against rotation about said hub shaft (5) by a separate securing element fixed to the hub shaft (5).

55. A multi-speed hub as set forth in claim 1 or claim 31, a securing element for both said sun wheels (9, 10) being located axially between the sun wheels (9, 10) on the hub shaft (5).

56. A multi-speed hub as set forth in claim 1 or claim 31, a securing element for securing said sun wheels (9, 10) against rotation being provided on each of the sides of the sun wheels (9, 10) remote from each other.

57. A multi-speed hub as set forth in claim 1, or claim 31, at least one axially movable coupling element being provided for selectively securing one of said sun wheels (9, 10) against rotation about said hub shaft (5).

58. A multi-speed hub as set forth in claim 1 or claim 31, securing means being provided for securing a selective one of said sun wheels (9, 10), said securing means being axially movable and being lockable in the respective axial position by ratchet means.

59. Multi-speed hub according to claim 58, characterised in that provided as the shift means is a shift rod which is guided in the hub shaft, in respect of which it can be locked in place by catch means.

60. A multi-speed hub as set forth in claim 1 or claim 31, said speed-change control means (12c, 12b, 12a) comprising a reversing lever system, said reversing lever system being lockable by catch means.

61. A multi-speed hub as set forth in claim 1 or claim 31, at least one of the sun wheels (9, 10) being provided with a special profile in a cenral bore thereof for being lockable with respect to rotation about the hub shaft (5).

62. A multi-speed hub as set forth in claim 1, at least one of the sun wheels (9, 10) being provided with a special external profile for locking engagement with the planet carrier (6), said planet carrier (6) being axially fixed.

63. A multi-speed hub as set forth in claim 1 or claim 31, said speed-change control means (12c, 12b, 12a) being combined with an auxiliary sleeve which is lockable with the planet carrier, said planet carrier being axially fixed.

64. A multi-speed hub as set forth in claim 1 or claim 31, a spring element being provided which serves for locking at least one of a thrust block and sliding sleeve.

65. A multi-speed hub as set forth in claim 1 or claim 31, coupling means being provided for locking at least one of the sun wheels (9, 10) with respect to the hub shaft (5), said coupling means being provided with back-tapered coupling faces to cooperate with correspondingly shaped coupling faces on the respective sun wheels (9, 10).

66. A multi-speed hub as set forth in claim 1 or claim 31, said torque transmission member (14) being a coupling bush (14) having at least one set of teeth (14b) for engagement with the driver (3), said at least one set of teeth being helical in construction and being in engagement with correspondingly shaped internal teeth (3b) of the driver (3).

* * * * *